(12) United States Patent
Fielder

(10) Patent No.: US 10,275,364 B2
(45) Date of Patent: Apr. 30, 2019

(54) SECURE ISLAND COMPUTING SYSTEM AND METHOD

(71) Applicant: PACID TECHNOLOGIES, LLC, Austin, TX (US)

(72) Inventor: Guy Fielder, Austin, TX (US)

(73) Assignee: PACID TECHNOLOGIES, LLC, Austin, TX (US)

( * ) Notice: Subject to any disclaimer, the term of this patent is extended or adjusted under 35 U.S.C. 154(b) by 93 days.

(21) Appl. No.: 15/197,594

(22) Filed: Jun. 29, 2016

(65) Prior Publication Data

US 2017/0097900 A1    Apr. 6, 2017

Related U.S. Application Data

(63) Continuation of application No. 13/904,707, filed on May 29, 2013, now Pat. No. 9,443,110, which is a
(Continued)

(51) Int. Cl.
| | | |
|---|---|---|
| G06F 12/14 | (2006.01) | |
| G06F 21/78 | (2013.01) | |
| H04L 29/06 | (2006.01) | |

(52) U.S. Cl.
CPC .......... *G06F 12/1408* (2013.01); *G06F 21/78* (2013.01); *H04L 63/061* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,613,901 | A | 9/1986 | Gilhousen et al. |
| 4,649,233 | A | 3/1987 | Bass et al. |

(Continued)

FOREIGN PATENT DOCUMENTS

| | | | |
|---|---|---|---|
| EP | 1304848 A2 | 4/2003 | |
| EP | 1478156 A2 | 11/2004 | |

(Continued)

OTHER PUBLICATIONS

Barrett, Daniel and Silverman, Richard, "SSH, The Secure Shell: The Definitive Guide, 2nd Edition", O'Reilly Media, Section 2.4, Section 3.3, Section 3.4, Section 6.1-6.7. May 1, 2005.
(Continued)

*Primary Examiner* — Theodore C Parsons
(74) *Attorney, Agent, or Firm* — Ascenda Law Group, PC

(57) ABSTRACT

A mobile computing device includes a secure token, having an embedded processor, a secure persistent storage medium, and a read only memory; and, an application processor and application memory separate from the embedded processor, the secure persistent storage medium, and the read only memory. The application memory stores application instructions for execution by the application processor. The secure persistent storage medium is configured by the embedded processor to store a master secret for an application executing on a remote host. The read only memory stores a security application for receiving, from the remote host, an identifier associated with the master secret; generating, using at least the identifier, a decryption key; obtaining, using the decryption key, from the secure persistent storage medium the master secret; constructing, using the master secret as an input, a pseudorandom result of a cryptographic operation; and returning it to the application executing at the remote host.

21 Claims, 19 Drawing Sheets

Related U.S. Application Data continuation of application No. 13/592,698, filed on Aug. 23, 2012, now Pat. No. 8,479,021.

(60) Provisional application No. 61/540,878, filed on Sep. 29, 2011.

(52) U.S. Cl.
CPC ........ *H04L 63/083* (2013.01); *H04L 63/0807* (2013.01); *H04L 63/0861* (2013.01); *G06F 2212/1052* (2013.01)

(56) References Cited

U.S. PATENT DOCUMENTS

| | | | |
|---|---|---|---|
| 4,720,860 A | 1/1988 | Weiss | |
| 4,864,615 A | 9/1989 | Bennett et al. | |
| 4,924,515 A | 5/1990 | Matyas et al. | |
| 4,937,866 A | 6/1990 | Crowther et al. | |
| 5,020,105 A | 5/1991 | Rosen et al. | |
| 5,060,263 A | 10/1991 | Bosen et al. | |
| 5,065,429 A | 11/1991 | Lang | |
| 5,068,894 A | 11/1991 | Hoppe | |
| 5,153,919 A | 10/1992 | Reeds, III et al. | |
| 5,233,655 A | 8/1993 | Shapiro | |
| 5,237,610 A | 8/1993 | Gammie et al. | |
| 5,241,598 A | 8/1993 | Raith | |
| 5,309,516 A | 5/1994 | Takaragi et al. | |
| 5,355,413 A | 10/1994 | Ohno | |
| 5,361,062 A | 11/1994 | Weiss et al. | |
| 5,367,572 A | 11/1994 | Weiss | |
| 5,475,758 A | 12/1995 | Kikuchi | |
| 5,475,826 A | 12/1995 | Fischer | |
| 5,481,611 A | 1/1996 | Owens et al. | |
| 5,495,533 A | 2/1996 | Linehan et al. | |
| 5,638,448 A | 6/1997 | Nguyen | |
| 5,757,924 A | 5/1998 | Friedman et al. | |
| 5,796,830 A | 8/1998 | Johnson et al. | |
| 5,953,420 A | 9/1999 | Matyas, Jr. et al. | |
| 5,963,646 A | 10/1999 | Fielder et al. | |
| 5,963,696 A | 10/1999 | Yoshida et al. | |
| 5,966,441 A | 10/1999 | Calamera | |
| 5,974,550 A | 10/1999 | Maliszewski | |
| 5,995,624 A | 11/1999 | Fielder et al. | |
| 6,049,612 A | 4/2000 | Fielder et al. | |
| 6,105,133 A | 8/2000 | Fielder et al. | |
| 6,345,101 B1 | 2/2002 | Shukla | |
| 6,587,563 B1 | 7/2003 | Crandall | |
| 6,769,060 B1 | 7/2004 | Dent et al. | |
| 6,947,556 B1 | 9/2005 | Matyas, Jr. et al. | |
| 6,987,853 B2 | 1/2006 | Uner | |
| 7,032,240 B1 | 4/2006 | Cronce et al. | |
| 7,080,037 B2 | 7/2006 | Burger et al. | |
| 7,095,855 B1 | 8/2006 | Collins | |
| 7,340,614 B2 | 3/2008 | Fujiwara et al. | |
| 7,461,406 B2 | 12/2008 | Pelly et al. | |
| 7,890,769 B2 | 2/2011 | Chen et al. | |
| 7,917,630 B2 | 3/2011 | Holden et al. | |
| 8,010,810 B1 | 8/2011 | Fitzgerald et al. | |
| 8,416,954 B1* | 4/2013 | Raizen ............... | H04L 63/0428 380/277 |
| 2002/0049818 A1 | 4/2002 | Gilhuly et al. | |
| 2002/0191796 A1 | 12/2002 | Muschenborn | |
| 2004/0025028 A1 | 2/2004 | Takeuchi | |
| 2004/0179684 A1 | 9/2004 | Appenzeller et al. | |
| 2005/0039030 A1 | 2/2005 | Rodgers et al. | |
| 2005/0076061 A1 | 4/2005 | Cox | |
| 2005/0268116 A1 | 12/2005 | Jeffries | |
| 2006/0112418 A1 | 5/2006 | Bantz et al. | |
| 2006/0174349 A1 | 8/2006 | Cronce et al. | |
| 2007/0098175 A1 | 5/2007 | Jakubiec | |
| 2007/0258584 A1 | 11/2007 | Brown et al. | |
| 2008/0016226 A1 | 1/2008 | Holden et al. | |
| 2008/0091605 A1 | 4/2008 | Hughes et al. | |
| 2008/0144787 A1 | 6/2008 | Gantman et al. | |
| 2008/0148369 A1 | 6/2008 | Aaron | |
| 2008/0208758 A1 | 8/2008 | Spiker et al. | |
| 2008/0263363 A1* | 10/2008 | Jueneman ............... | G06F 21/32 713/184 |
| 2008/0270791 A1 | 10/2008 | Nystrom et al. | |
| 2010/0042846 A1 | 2/2010 | Trotter et al. | |
| 2010/0122327 A1 | 5/2010 | Linecker et al. | |
| 2010/0217964 A1* | 8/2010 | Peterka ............ | G01R 31/31719 713/2 |

FOREIGN PATENT DOCUMENTS

| | | | |
|---|---|---|---|
| EP | | 1906587 A2 | 4/2008 |
| GB | | 2421407 A | 6/2006 |
| WO | WO | 98/47258 A2 | 10/1998 |
| WO | WO | 03/077469 A1 | 9/2003 |
| WO | WO | 2004/092864 A2 | 10/2004 |
| WO | WO | 2007/005909 A2 | 1/2007 |
| WO | WO | 2008/061848 A2 | 5/2008 |

OTHER PUBLICATIONS

Bellare, Mihir Rogaway, Phillip, "Entity Authentication and Key Distribution," Advances in Crypto 1993 Proceedings, Springer-Verlag (Aug. 1993).

Berson, Thomas A., "Differential Cryptanalysis Mod 232 with Applications to MD5". Eurocrypt (1992), 658:71-80.

Bert den Boer, Antoon Bosselaers (1993). Collisions for the Compression Function of MD5. Berlin; London: Soringer. ISBN 3-540-57600-2.

Bird, R. et al, "The KryptoKnight Family of Light-Weight Protocols for Authentication and Key Distribution," IEEE/ACM Transactions on Networking, vol. 3, No. 1, pp. 31-41, IEEE Press, Piscataway, NJ, Feb. 1995.

Carl Meyer and S.M. Matyas, Cryptography: A New Dimension in Computer Data Security (1982).

Cheng, P. et al., Modular Key Management Protocol (MKMP), Nov. 28, 1994.

Damgard; "A Design Principle for Hash Functions"; Advances in Cryptology: Proceedings of Crypto '89, vol. 435 o Lecture Notes in Computer Science; pp. 416-427; Springer-Verlag, New York (12 pages).

Ehrsam, W.F. et al., A Cryptographic Key Management Scheme for Implementing the Data Encryption Standard, IBM Sys. J., vol. 17 No. 2, 1978.

Freier, A. et ai.,"SSL Version 3.0,"Netscape Communications Corporation, Dec. 1995.

Gasti, Paolo et al., "Breaking and Fixing the Self Encryption Scheme for Data Security in Mobile Devices", IEEE Computer Society, 18th Euromicro Conference on Parallel, Distributing and Network-based Processing, pp. 624-630, 2010.

Gong, L., "Using One-Way Functions for Authentication," ACM Sigcom Computer Communication Review, vol. 19, Issue 5, pp. 8-11, New York, 1989.

Hans Dobbertin, "The Status of MD5 After a Recent Attack", RSA Laboratories; CryptoBytes, 1996.

Hans Dobbertin, Cryptanalysis of MD5 Compress, May 2, 1996.

International Preliminary Report on Patentability and The Written Opinion issued in PCT/US2010/028562; Dated: Oct. 6, 2011; (22 pages).

International Preliminary Report on Patentability and The Written Opinion issued in PCT/US2010/028565 dated Oct. 6, 2011; (23 pages).

International Preliminary Report on Patentability and The Written Opinion issued in PCT/US2010/028566; Dated: Oct. 6, 2011; (14 pages).

International Preliminary Report on Patentability and The Written Opinion issued in PCT/US2010/028582; dated Oct. 6, 2011 (8 pages).

International Preliminary Report on Patentability and The Written Opinion issued in PCT/US2010/028583; dated Oct. 6, 2011; (9 pages).

(56) References Cited

OTHER PUBLICATIONS

International Search Report and The Written Opinion issued in PCT/US2010/028562; dated Sep. 29, 2010; (31 pages).
International Search Report and The Written Opinion issued in PCT/US2010/028565; dated Oct. 6, 2010; (31 pages).
International Search Report and The Written Opinion issued in PCT/US2010/028566; dated Dec. 30, 2010; (17 pages).
International Search Report and The Written Opinion issued in PCT/US2010/028582; dated Jul. 30, 2010; (21 pages).
International Search Report and The Written Opinion issued in PCT/US2010/028583; dated Jul. 6, 2010; (21 pages).
Kelsey, John et al., "Passphrase FAQ" alt.security.pgp, Oct. 1993.
Krawczyk, H., "SKEME: A Versatile Secure Key Exchange Mechanism for Internet," Proceedings of the 1996 Sympoium on Network and Distributed System Security (SNDSS) '96, pp. 114-127, IEEE Computer Society, Washington, DC (1996).
Lee, Ruby B. et al., "Architecture for Protecting Critical Secrets in Microprocessors", IEEE Proceedings of the 32nd International Symposium on Computer Architecture, Princeton University, NJ, 12 pages, 2005.
Leighton, T., "Secret Key Agreement without Public-Key Cryptography," Proceedings of the 13th Annual International Cryptology Conference on Advances in Cryptology, Santa Barbara, CA, pp 456-479, Springer-Verlag, New York, 1998.
Matyas, S.M. & Meyer, C.H., "Generation, Distribution, and Installation of Cryptograpic Keys," 17 IBM Sys. J. 2 (1978).
Menezes. Alfred J. et al., Handbook of Applied Cryptography, CRC Press, Oct. 16, 1996.
Merkle, R., "One Way Hash functions and DES," In G. Brassard, editor, Advances in Cryptology: Proceedings of CRYPTO'89, vol. 435 of Lecture Notes in Computer Science, pp. 428-446, Springer-Verlag, New York, 1990.
Molva, Reflik et al., "KryptoKnight Authentication and Key Distribution System," Computer Security-ESORICS 92 (Nov. 23-25, 1992).
Prabhakar, Ramya et al., "AMPISec I/O: Providing Data Confidentiality in MPI-I/O", IEEE Computer Society, 9th IEEE/ACM International Symposium on Cluster Computing and the Grid, University Park, PA pp. 388-395, 2009.
Preneel, B., "MDx-MAC and Building Fast MAGs from Hash Functions," Lecture Notes in Computer Science; vol. 963, Proceedings of the 15th Annual International Cryptology Conference on Advances in Cryptology, pp. 1-14, Springer-Verlag, London, UK (1995).
Rivest, R., "The MD5 Message-Digest Algorithm," IETF RFC 1321, Apr. 1992.
RSA Laboratories, "PKCS #5: Password-Based Encryption Standard," version 1.5, Nov. 1993.
RSA Laboratories, PKCS #5 v2.0: Password-Based Cryptography Standard, Mar. 25, 1999.
Schneider, B., "Security Pitfalls in Cryptography", Counterpane Systems, www.counterpane.com/publish.html, 1998, (11 pages).
Schneier, B., "Cryptographic Design Vulnerabilities", Counterpane Systems, www.counterpane.com/publish.html, Sep. 1998, (5 pages).
Schneier, Bruce, Applied Cryptography, Katherine Schowalter, 1996 (and first edition (1994) of same).
Schneier. B . "Why Cryptography is Harder Than it Looks". Counterpane Systems, www.counterpane.com/publish.html, 1997, (8 pages).
U.S. Department of Commerce, National Institute of Standards and Technology, "Secure Hash Standard", FIPS PUB 180-1, Apr. 17, 1995. (24 pages).
Windows '95 Vulnerabilities, US Department of Energy, Computer Incident Advisory Committee, available at http://ftp.cerias.purdue.edu/pub/lists/academic-firewalls/academic-firewalls.951224 (1995).
Yang, Fuw-Yi et al., "A Secure Control Protocol for USB Mass Storage Devices", IEEE Transactions on Consumer Electronics, vol. 56, No. 4, pp. 2339-2343, 2010.
Yuill, J., Denning, D., Feer, F.; "Using Deception to Hide Things from Hackers: Processes, Principles, and Techniques", Journal of Information Warfare, (16 pages).
Zhoujun Li, Jinxin Ma et al., "A Novel Secure Virtual Storage Device Scheme", IEEE Transactions on Consumer Electronics, pp. 271-275, 2010.
Zhu, Ligu et al., "Research on Data Security of the Storage Network", IEEE Transactions on Consumer Electronics, pp. 1596-1601, 2006.

\* cited by examiner

SECURE ISLAND COMPUTING SYSTEM AND METHOD

CROSS-REFERENCE TO RELATED APPLICATIONS

This application is a CONTINUATION of U.S. application Ser. No. 13/904,707, filed May 29, 2013, which is a CONTINUATION of U.S. application Ser. No. 13/592,698, filed Aug. 23, 2012, now U.S. Pat. No. 8,479,021, which claims the priority benefit of U.S. Provisional Patent Application No. 61/540,878, filed Sep. 29, 2011, incorporated herein by reference in its entirety.

BACKGROUND

The computer system assists in managing (e.g., storing, organizing, and communicating) a large amount of information. Some of the information managed by a computer system is confidential. In other words, access to such information is intended to be limited. Traditional protection schemes attempt to prevent unauthorized users from accessing the confidential information by requiring that a user provide authentication credentials, at a predefined entry point, to access an account that includes the confidential information. Protecting only the predefined entry points, however, fails to account for nefarious individuals creating other entry points by exploiting computer system vulnerabilities. For example, knowledge of a user's hardware and software system, system configuration, types of network connections, etc., may be used to create an entry point and gain access to the confidential information.

In order to prevent unauthorized access to the confidential information, the confidential information may be encrypted. Encryption is a process of transforming the clear text confidential information into an encrypted format that is unreadable by anyone or anything that does not possess the decryption key. An encryption algorithm and an encryption key are used to perform the transformation. Encryption technology is classified into two primary technology types: symmetric encryption technology and asymmetric encryption technology. Symmetric encryption technology uses the same encryption key to both encrypt and decrypt information. Asymmetric encryption technology uses a pair of corresponding encryption keys: one encryption key to encrypt data and the other encryption key of the pair to decrypt the data.

SUMMARY

In general, in one aspect, the invention relates to a method for generating an n-bit result that includes receiving, by a secure containment device (SCD), a request to generate the n-bit result. The request includes an n-bit generator input and a master secret identifier and where the request is sent from an application executing on a host system using a first input/output (I/O) interface. The method further includes disabling, by the SCD, all I/O interfaces on the SCD between the host system and the SCD after receiving the request from the host system. The method further includes after disabling all the I/O interfaces on the SCD between the host system and the SCD, the SCD providing the n-bit generator input and the master secret identifier to a secured hardware token over a second I/O interface, receiving the n-bit result from the secured hardware token over the second I/O interface, enabling at least the first I/O interface after the n-bit result is generated, and providing, after enabling the first I/O interface, the n-bit result to the application using the first I/O interface.

In general, in one aspect, the invention relates to a non-transitory computer readable medium that includes instructions, which when executed perform a method, the method that includes receiving, by a secure containment device (SCD), a request to generate an n-bit result. The request includes an n-bit generator input and a master secret identifier and where the request is sent from an application executing on a host system using a first input/output (I/O) interface. The method further includes the SCD disabling all I/O interfaces on the SCD between the host system and the SCD after receiving the request from the host system. After disabling all the I/O interfaces on the SCD between the host system and the SCD, the SCD provides the n-bit generator input and the master secret identifier to a secured hardware token over a second I/O interface, receives the n-bit result from the secured hardware token over the second I/O interface, enables at least the first I/O interface after the n-bit result is generated, and provides, after enabling the first I/O interface, the n-bit result to the application using the first I/O interface.

In general, in one aspect, the invention relates to a secure containment device (SCD), that includes a first input/out (I/O) interface connected to a host system, a second I/O interface connected to a secured hardware token, a processor, and a memory. The memory is connected to the processor and includes instructions, when executed by the processor perform a method. The method includes receiving, from an application on the host system over the first I/O interface, a request to generate an n-bit result. The request includes an n-bit generator input and a master secret identifier. The method further includes disabling, by the SCD, the first I/O interface. After disabling the first I/O interface, the method further includes providing the n-bit generator input and the master secret identifier to the secured hardware token over the second I/O interface, receiving the n-bit result from the secured hardware token over the second I/O interface, enabling the first I/O interface after the n-bit result is generated, and providing, after enabling the first I/O interface, the n-bit result to the application using the first I/O interface.

In general, in one aspect, the invention relates to a secure containment device (SCD), that includes a first input/out (I/O) interface connected to a host system, a second I/O interface connected to a secured hardware token, and an integrated circuit. The integrated circuit is configured to receive, from an application on the host system over the first I/O interface, a request to generate an n-bit result. The request includes an n-bit generator input and a master secret identifier. The integrated circuit is further configured to disable the first I/O interface. After disabling the first I/O interface, the integrated circuit is configured to provide the n-bit generator input and the master secret identifier to the secured hardware token over the second I/O interface, receive the n-bit result from the secured hardware token over the second I/O interface, enable the first I/O interface after the n-bit result is generated, and provide, after enabling the first I/O interface, the n-bit result to the application using the first I/O interface.

Other aspects of the invention will be apparent from the following description and the appended claims.

BRIEF DESCRIPTION OF DRAWINGS

FIGS. 2F-2I show flow diagrams for using a secure island device in accordance with one or more embodiments of the invention.

DETAILED DESCRIPTION

Figure 1A:
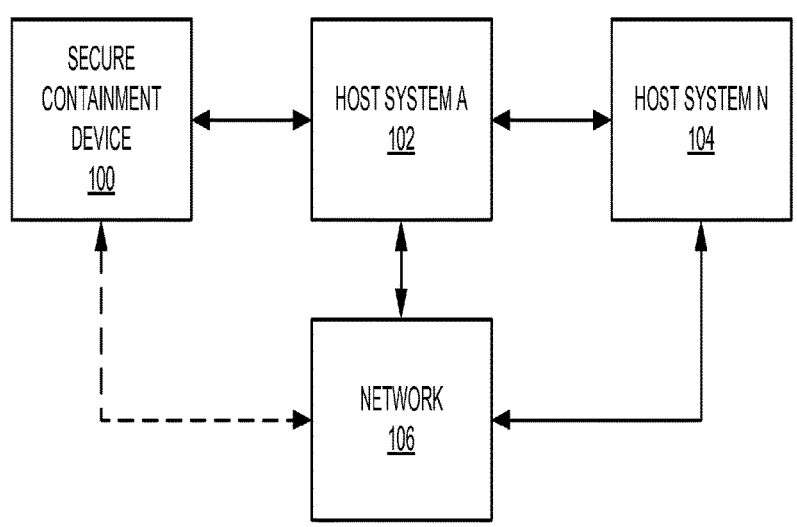
FIG. 1A shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, the embodiments of the invention presented below may be combined and/or modified to create additional one or more embodiments without departing from the scope of the invention.

In general, in one aspect, the invention relates to a method and system for securely obtaining n-bit results and/or decrypting and encrypting data. More specifically, embodiments of the invention relate to generating n-bit results in a manner that prevents (or substantially prevents) third parties from obtaining the n-bit results or inputs used to generate the n-bit results, where the n-bit results are used to encrypt, decrypt, digitally sign, or perform other operations. Further, embodiments of the invention prevent (or substantially prevent) third parties from obtaining the n-bit results of the inputs used to generate the n-bit results by disabling I/O interfaces.

More specifically, FIGS. 1A-1J show a secure containment device (SCD) that includes functionality to disable I/O interfaces between the SCD and the host system while the n-bit result is being generated. By disabling the I/O interfaces, the SCD may prevent (or substantially prevent) nefarious parties from accessing the inputs used to generate the n-bit result. This will prevent (or substantially prevent) nefarious third parties from re-generating the n-bit result. As a result, the SCD may provide an extra layer of security for transactions in which an n-bit result is required.

FIGS. 2A-2I show another embodiment of the invention. More specifically, FIGS. 2A-2I are directed to a secure island device (SID) that may enable the secure viewing of sensitive data and prevent nefarious third parties from accessing the secure data while it is in an unencrypted, clear text, or exposed state and/or obtain any information necessary to decrypt the secure data. Such nefarious third parties correspond to nefarious individuals and nefarious computer systems that are not the intended receiver of the sensitive data. In particular, the SID is configured to receive an encrypted file. Once the file is received, the SID disables all I/O interfaces while the n-bit result is generated and subsequently used to decrypt the file. While the file is decrypted the decrypted file may not be copied or otherwise communicated outside the SID. Once the user has finished viewing the decrypted file, all secure data (which includes all data used to decrypt the encrypted file along with the decrypted file) are removed from the SID. Once the removal is complete, the SID may re-enable I/O interfaces.

Turning to FIG. 1A, FIG. 1A shows a system in accordance with one or more embodiments of the invention. The system includes a secure containment device (SCD) (100), host systems (e.g., Host system A (102), Host system N (104)), and network (106). Those skilled in the art will appreciate that while two host systems are shown in FIG. 1A, the system may include more than two host systems. Further, the SCD may be configured to connect to more than one host system. Each of the aforementioned systems is described below.

In one or more embodiments of the invention, the SCD corresponds to any device configured to perform the functions (and/or store data) as described below with respect to FIGS. 1G-1J. Three exemplary SCDs are described below in FIGS. 1B-1D. In general, referring to FIG. 1A, the SCD (100) includes functionality to connect (in a wired and/or wireless manner) with a host system (e.g., Host system A (102)). In addition, the SCD may include functionality to connect (in a wired and/or wireless manner) with network (106). In one or more embodiments of the invention, the SCD may be implemented as an external QWERTY keyboard that is modified to include components shown in FIGS. 1B-1D and perform the functionality described in FIGS. 1G-1J. In one or more embodiments of the invention, the SCD may be implemented as a 10-button keypad that is modified to include components shown in FIGS. 1B-1D and perform the functionality described in FIGS. 1G-1J. In one or more embodiments of the invention, the SCD may be implemented as a 12-button keypad that is modified to include components shown in FIGS. 1B-1D and perform the functionality described in FIGS. 1G-1J. In one or more embodiments of the invention, the SCD is implemented as a 19-button keypad that is modified to include components shown in FIGS. 1B-1D and perform the functionality described in FIGS. 1G-1J. In one or more embodiments of the invention, the SCD may be implemented as a smart phone that is modified to perform the functionality described in FIGS. 1G-1J. In one or more embodiments of the invention, the SCD may be implemented as a tablet device that is modified to perform the functionality described in FIGS. 1G-1J. In one or more embodiments of the invention, the SCD may be implemented as a small footprint computing device (e.g., netbook) that includes the components shown in FIGS. 1B-1D and the functionality described in FIGS. 1G-1J. Those skilled in the art will appreciate that the SCD implementations are not limited to the embodiments discussed above.

Those skilled in the art will appreciate that modifying the aforementioned devices to obtain the SCD may include modifying hardware, firmware, and/or software on the aforementioned devices.

Continuing with the discussion of FIG. 1A, each of the host systems (e.g., Host system A (102), Host system N (104)) is a computing device. In one or more embodiments of the invention, a computing device is any physical or virtual device that may be used for performing various embodiments of the invention (as described below). The physical device may correspond to any physical system with functionality to implement one or more embodiments of the invention. For example, the physical device may be implemented on a general purpose computing device (i.e., a device with a processor(s) and an operating system) such as, but not limited to, a desktop computer, a laptop computer, a gaming console, and a mobile device (e.g., a mobile phone, a smart phone, a personal digital assistant, a gaming device, etc.).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that includes a general purpose processor(s) and an application-specific processor(s)/hardware. In such cases, one or more portions of the invention may be implemented using the operating system and general purpose processor(s), and one or more portions of the invention may be implemented using the application-specific processor(s)/hardware.

The virtual device may correspond to a virtual machine. Broadly speaking, the virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures. VMware® is a registered trademark of VMware, Inc. Xen® is a trademark overseen by the Xen Project Advisory Board.

Further, regardless of the implementation of the host systems, the host systems may include (or be operatively connected to) one or more of the following: associated memory (e.g., random access memory (RAM), cache memory, flash memory, etc.), a storage device (e.g., a hard disk, an optical drive such as a compact disc drive or digital versatile disk (DVD) drive, a flash memory stick, etc.), one or more input mechanisms (e.g., a keyboard, a touch screen, a pointing device, such as a mouse, touchpad, trackball, joystick, etc., a microphone), a display (e.g., a liquid crystal display (LCD), a plasma display, or cathode ray tube (CRT) monitor), speakers, and one or more communication interfaces (e.g., a network interface (wired and/or wireless), a Bluetooth Interface, a Universal Serial Bus (USB) interface, a Firewire interface, etc.)

Continuing with the discussion of FIG. 1A a network (106) corresponds to any wired or wireless network using any known communication protocol. Those skilled in the art will appreciate that the invention is not limited to the system configuration shown in FIG. 1A.

Figure 1B:
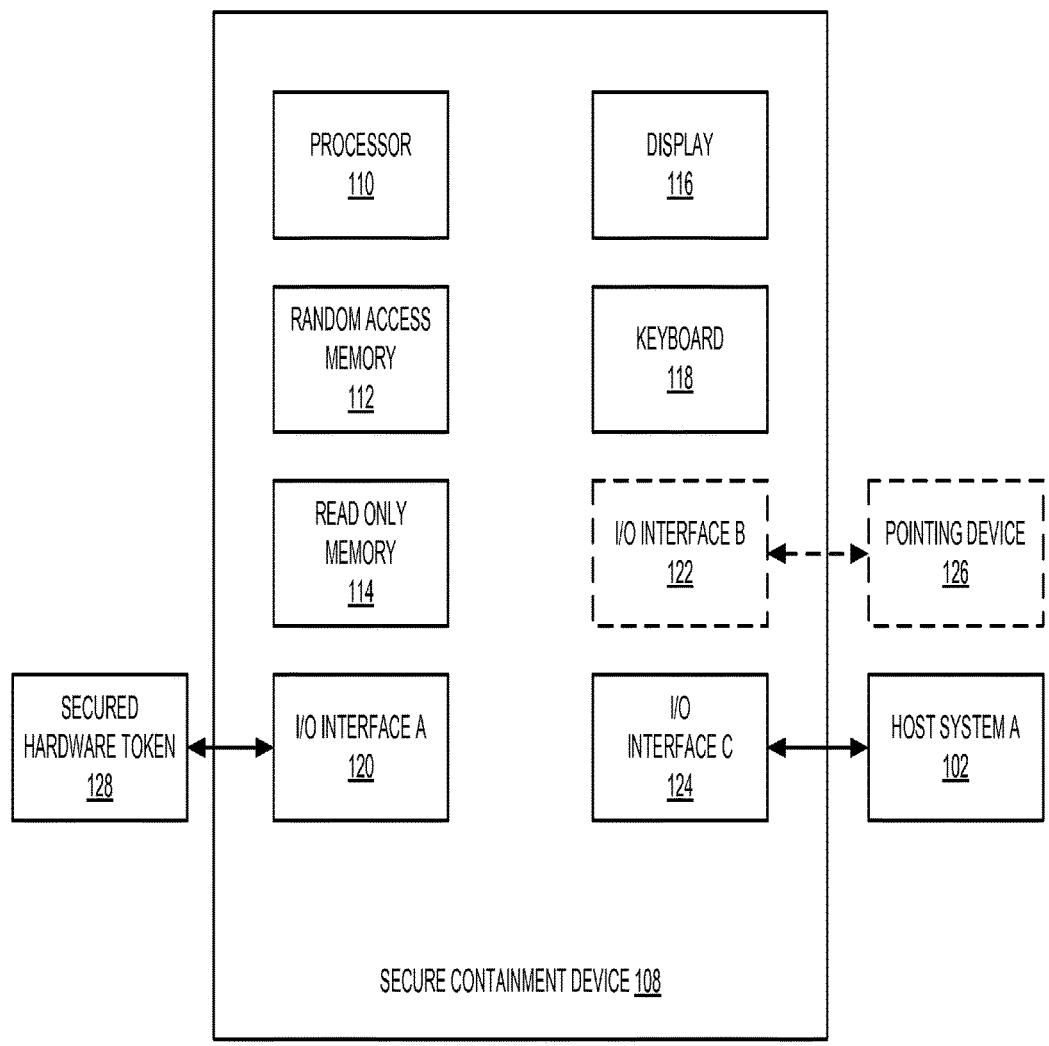
FIGS. 1B-1D show secure containment devices (SCDs) in accordance with one or more embodiments of the invention.
Figure 1C:
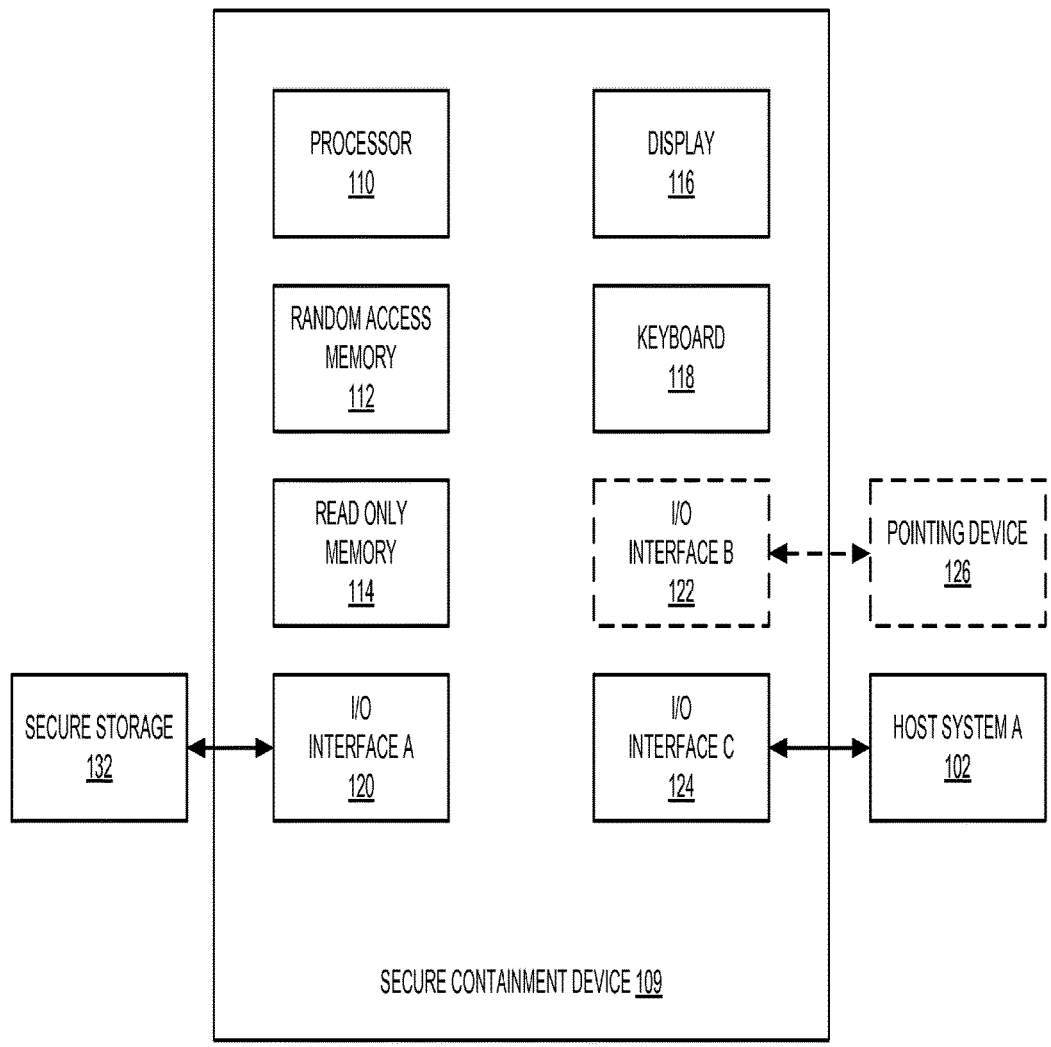
Figure 1D:
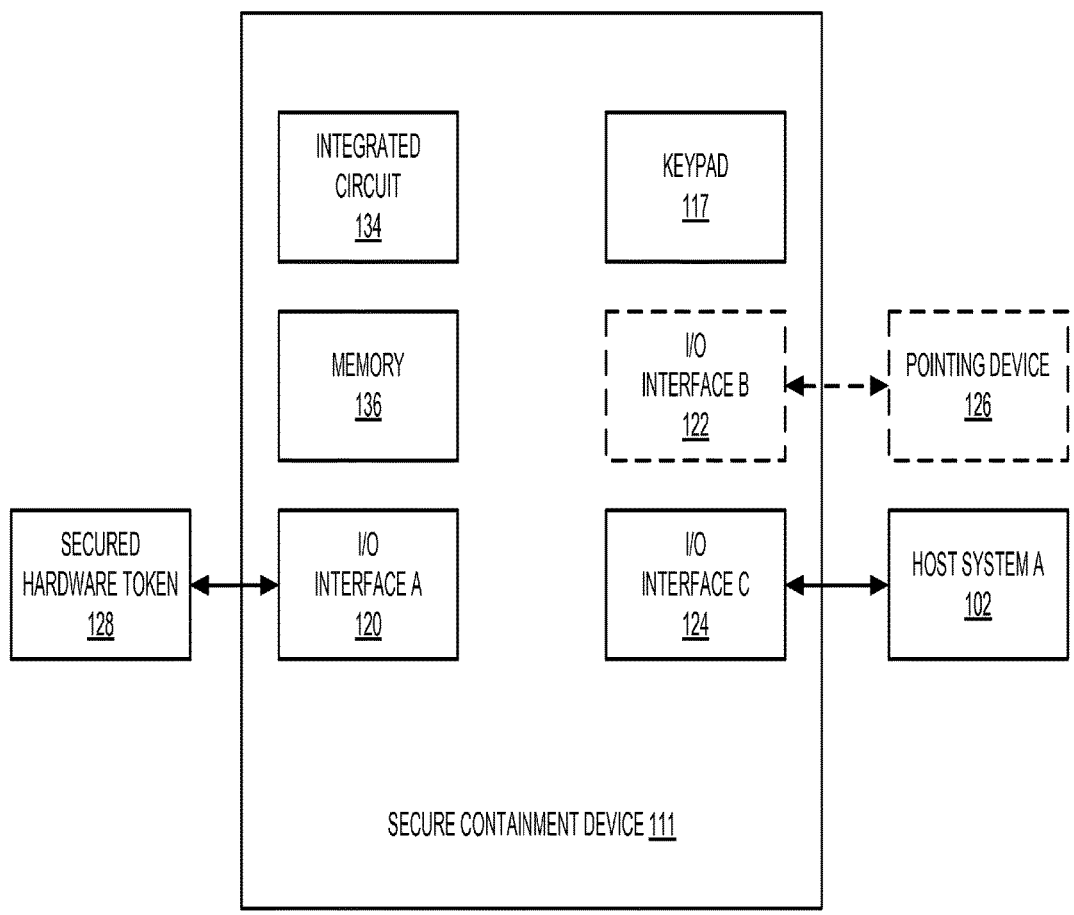

FIGS. 1B-1D show various embodiments of a SCD. The implementation of the SCD is not limited to the embodiments shown in FIGS. 1B-1D.

Turning to FIG. 1B, the SCD (108) includes a processor (110), random access memory (112), read-only memory (114), a display (116), a keyboard (118), and input and/or output (I/O) interfaces (120, 122, 124). Each of these components is described below.

In one or more embodiments of the invention, the processor (110) corresponds to any processor (single or multi-core) configured to execute the instructions stored in the read-only memory (114). In one or more embodiments of the invention, the processor (110) has a complex instruction set computing (CISC) architecture. In another embodiment of the invention, the processor (110) has a reduced instruction set computing (RISC) processor. In one or more embodiments of the invention, the processor (110) has an Advanced RISC Machine (ARM) architecture. ARM is a registered trademark of ARM Ltd.

Figure 1E:
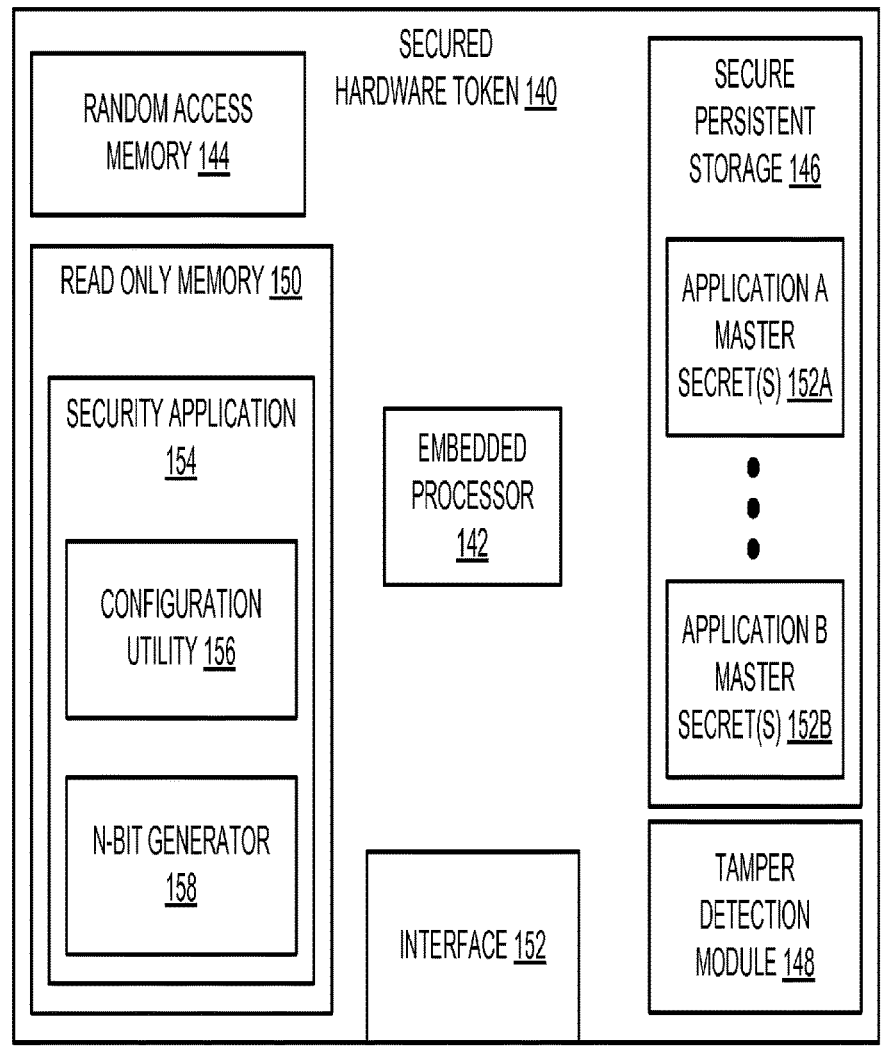
FIG. 1E shows a secured hardware token in accordance with one or more embodiments of the invention.

In one or more embodiments of the invention, the random access memory (RAM) (112) is configured to store values generated during the execution of instructions by the processor (110) or values provided by the secured hardware token (128), the pointing device (126) and/or the host system A (102). Though not shown in FIG. 1A, those skilled in the art will appreciate that the SCD (108) may include other readable/writeable storage, where such storage may be implemented using flash memory, solid state memory, magnetic memory, optical memory, or any combination thereof. One embodiment of the secured hardware token is shown in FIG. 1E.

In one or more embodiments of the invention, the read-only memory (114) is configured to store executable instructions to perform the functions described in FIGS. 1G-1J below. In one or more embodiments of the invention, the executable instructions are stored in read-only memory (114) to prevent unauthorized modification of the executable instructions. In one or more embodiments of the invention, the read-only memory (114) may be removable such that updates to the executable instructions may be performed. In such cases, the read-only memory (114) may be removed from the SCD (108), and new read-only memory (114) with the updated executable instructions may be inserted into the SCD (108). In one or more embodiments of the invention, the read-only memory (114) may be implemented as firmware.

In one or more embodiments of the invention, the display (116) corresponds to any output device that includes functionality to at least output alpha characters (either in the English alphabet, an alphabet of another language, or characters in another language) and/or numeric characters (either Arabic numerals, or other characters in another language that correspond to Arabic numerals). In one or more embodiments of the invention, the display (116) is also configured to receive input directly from a user, for example, via a stylus or finger(s). In such embodiments the display (116) may be a touch screen display implemented, for example, as a resistive touch screen or a capacitive touch screen. The size of the display may vary based on the implementation of the SCD.

In one or more embodiments of the invention, the keyboard (118) is any input device that includes alpha characters (either in the English alphabet, an alphabet of another language, or characters in another language) and numeric characters (either Arabic numerals, or other characters in another language that correspond to Arabic numerals). In one or more embodiments of the invention, the keyboard (118) is a QWERTY keyboard. In one or more embodiments of the invention, the keyboard (118) may be combined with the display (116). For example, the display (116) may include a virtual keyboard (118). Alternatively, the keyboard (118) may be distinct from the display (116).

In one or more embodiments of the invention, the I/O interfaces (120, 122, 124) correspond to interfaces that permit I/O to and from the SCD (108). The I/O interfaces (120, 122, 124) may be wired or wireless I/O interfaces. Examples of I/O interfaces include, but are not limited to, a Bluetooth Interface, a Universal Serial Bus (USB) interface, a serial cable interface, a parallel cable interface, a SD interface, a microSD interface, a miniSD interface, an interface that is compliant with the Global System for Mobile Communications (GSM) standard, an interface that is compliant with the General Packet Radio Service (GPRS) standard, one or more of the IEEE 802 standards, an infrared (IR) interface, a Radio-Frequency Identification (RFID) interface, a wireless networking interface, interfaces compliant with ISO/IEC 14443 standard, interfaces compliant with ISO/IEC 7816 standard, interfaces compliant with IEEE 1394 (Firewire), a PS/2 interface, etc.

In one or more embodiments of the invention, I/O interfaces (120, 122, 124) in the SCD (108) may all be of the same type, may all be of different types, a subset of the I/O interfaces may be of one type and the remaining I/O interfaces may each be of a different type, or a subset of the I/O interfaces may be of one type and the remaining I/O interfaces may all be of another type.

As shown in FIG. 1B, the secured hardware token (128) is configured to interface with the SCD (108) over at least one of the I/O interfaces (120), and the host system A (102) is configured to interface with the SCD (108) over at least another one of the I/O interfaces (124). Finally, the SCD (108) may include an interface (122) for a pointing device (126) (or other input device). One or more embodiments of the secured hardware token in shown in FIG. 1E.

Referring to FIG. 1C, FIG. 1C shows a SCD (109) in accordance with one or more embodiments of the invention. SCD (109) includes a processor (110), random access memory (112), read-only memory (114), a display (116), a keyboard (118), and I/O interfaces (120, 122, 124). The like-numbered components shown in FIG. 1C are described above with respect to FIG. 1B. However, in the embodiment shown in FIG. 1C, the SCD (109) interfaces with secure storage (132) (see FIG. 1F). In this embodiment of the invention, the functionality to generate the n-bit result (as described below in FIGS. 1E-1J) is implemented on the SCD (109). More specifically, the functionality to generate the n-bit result is implemented by executing instructions from the read-only memory (114).

Referring to FIG. 1D, FIG. 1D shows a SCD (111) in accordance with one or more embodiments of the invention. SCD (111) includes an integrated circuit (134), memory (136), a keypad (117), and I/O interfaces (120, 122, 124). The like-numbered components shown in FIG. 1D are described above with respect to FIG. 1B.

In one or more embodiments of the invention, the integrated circuit (134) includes circuits configured to provide the functionality described in FIGS. 1G-1J below. Those skilled in the art will appreciate that the integrated circuit (134) may be replaced with any solution on a chip, one chip solution, single in-line package, double in-line package or multichip module without departing from the invention. More specifically, the integrated circuit (134) may be replaced with a circuit affixed to a substrate—typically silicon or ceramic. Alternatively, or in addition to the aforementioned embodiment, the integrated circuit (134) may be replaced with a field programmable gate array (FPGA), an application specific integrated circuit (ASIC), an embedded processor core, or any combination thereof. In one or more embodiments of the invention, the memory (136) corresponds to volatile and/or non-volatile memory configured to store values generated by the integrated circuit (134) or values provided by the secured hardware token (128), the pointing device (126) and/or the host system (102).

In one or more embodiments of the invention, the keypad (117) corresponds to an input device that includes numerals 0-9 (other corresponding numerals in another language). The keypad (117) includes a subset of buttons (or inputs) as compared with a keyboard (as described above). The keypad (117) may be, for example, a telephone 12-button keypad. Those skilled in the art will appreciate that any keypad may be used without departing from the invention.

Though not shown in FIGS. 1B-1D, in one or more embodiments of the invention, the SCD may include both a processor and an integrated circuit (or the alternatives discussed above). In such embodiments, the processor may be configured to execute instructions in order to perform the functionality described in FIGS. 1G-1J except for the generation of the n-bit result, which is generated by the integrated circuit (or by the alternatives discussed above).

Depending on the implementation of the SCD, the SCD may include an operating system and one or more applications. The complexity of the operating system as well as the number and type of application(s) on the SCD may vary based on the processing power of the SCD. In such cases, the operating system may be located in the read-only memory of the SCD or, alternatively, in persistent storage that is readable/writeable.

In one or more embodiments of the invention, the SCD may interface with both a secured hardware token and a secure storage. More specifically, depending on the specific use of the n-bit result, the SCD may use either the secured hardware token or the secure storage. For example, the secured hardware token may be used to generate n-bit results for specific applications executing on a host system (e.g., host system A), while the secure storage may be used for secure communication between two members (described below).

Those skilled in the art will appreciate that while the various embodiments of the SCDs shown in FIGS. 1B-1D include various types of memory (e.g., read-only memory and random access memory), that the SCDs may also include L1 cache, L2 cache, other volatile memory, and non-volatile memory that is readable/writable without departing from the invention.

Those skilled in the art will appreciate that while FIGS. 1B-1D showed embodiments of the SCD that include an embedded display and keyboard/keypad, the SCD may include an external display and/or an external keypad/keyboard without departing from the invention. The pointing device was shown as an external device but may also be embedded as a track-ball, joystick, or virtual pointing device on a touch screen without departing from the invention.

In one or more embodiments of the invention, the SCD may be implemented as a Personal Computer Memory Card International Association (PCMCIA) card, which interfaces with the host system via a PCMCIA slot in the host system. In this embodiment, the PCMCIA card would include firmware and integrated circuits (or the alternatives discussed above) to perform the functions described in FIGS. 1G-1J.

Further, the PCMCIA card would use the display of the host system to prompt the user to input user credentials or the token activation code (TAC) and use the keyboard to allow the user to input the user credentials or the TAC. In one or more embodiments of the invention, when the PCMCIA disables I/O (see, e.g., FIG. 1G, Step 105) the PCMCIA card would disable all I/O between the PCMCIA card and the host system except for I/O from the host system keyboard and the host system display.

FIG. 1E shows a secured hardware token in accordance with one or more embodiments of the invention. In one or more embodiments of the invention, the secured hardware token (140) is a physical device that is easily removable from the mobile device. For example, the secured hardware token (140) may be an external dongle or an internal card, such as a memory card. In one or more embodiments of the invention, an external dongle is any small tangible module that plugs in and sticks out of a socket. In one or more embodiments of the invention, the secured hardware token (140) includes an embedded processor (142), random access memory (144), secured persistent storage (146), a tamper detection module (148), read-only memory (150), and an interface (152). Each of these components is described below.

The embedded processor (142) corresponds to hardware logic configured to process instructions. In one or more embodiments of the invention, random access memory (144) is a memory module for temporary storage of data, such as n-bit results, n-bit generator input, master secret, master secret identifier, message digests, interim dynamic secrets, and change values. These values and/or results are further described below.

In one or more embodiments of the invention, a message digest is a string of characters (numeric, alpha, or alphanumeric). In one or more embodiments of the invention, the message digest is represented as a bit string, i.e., a string of ones and zeros. In one or more embodiments of the invention, an n-bit generator input is a string of characters (numeric, alpha, or alphanumeric). In one or more embodiments of the invention, the n-bit generator input is represented as a bit string, i.e., a string of ones and zeros. In one or more embodiments of the invention, a master secret is a random or pseudo-random sequence of bits that is not exposed outside of the secured hardware token (140). Each master secret is identified using a master secret identifier and is associated with an application. In one or more embodiments of the invention, the n-bit result is a bit string of length n, where the n-bit result corresponds to the message digest or a subset of bits from the message digest. In one or more embodiments of the invention, the change value is a bit string, where the change value is a subset of bits from the message digest. In one or more embodiments of the invention, the interim dynamic secret is obtained by combining the master secret and a change value.

Continuing with the discussion of FIG. 1E, the secure persistent storage (146) corresponds to a persistent storage (e.g., non-volatile) that is secured physically and/or electronically from unauthorized access. Data may be written to and read from the secure persistent storage. An example of physical security of the secure persistent storage (146) may correspond to detection of physical tampering of the secure persistent storage (146) by the tamper detection module(s) (148). Depending on the type of tamper detection implemented by the token, the token may include one or more tamper detection modules. Examples of electronic security of the secure persistent storage may correspond to (i) encryption of data stored in the secure physical storage; and (ii) monitoring of access attempts (e.g., how many times incorrect TACs were submitted to the token), etc. The electronic security may be implemented by the secured hardware token (140) (in particular the operating system or application stored on the secured hardware token (discussed below)).

Regardless of what attempts are used to breach the security measures of the token, the detection of an attempt or actual breach (physical and/or electronic) may result in (i) rendering the secure persistent storage physically inaccessible and/or (ii) clearing (or otherwise rendering unusable) the content of the secure persistent storage. The tamper detection module(s) (148) are configured to implement one or more of the above responses based on a detection of an attempted (or actual) breach.

In one or more embodiments of the invention, the data in the secured persistent storage is master secrets (e.g., application A master secret (152A), application B master secret (152B)) for each application. Specifically, each application (not shown) on the host system (not shown) may include at least one separate and unique corresponding master secret. In other words, different applications do not use the same master secret.

Continuing with the secured hardware token (140), in one or more embodiments of the invention, read-only memory (150) is a memory module configured to store a security application (154). The security application (154) may be a program configured to perform the functionality of the secured hardware token. Specifically, the security application (154) may include a configuration utility (156) and an n-bit generator (158). Although not shown in FIG. 1E, the security application may alternatively be implemented in hardware, for example, as an integrated circuit (or one of the alternatives discussed above).

Continuing with the discussion of FIG. 1E, in one or more embodiments of the invention, the configuration utility (156) includes functionality to create and store new master secrets in secured persistent storage. For example, the configuration utility may include functionality to interact with an application, an external device (not shown), or a user to assist in the generation and/or storage of a new master secret. The configuration utility may further include functionality to initialize the secured hardware token for the user. For example, the configuration utility may include functionality to obtain new credentials (e.g., biometric data, a token authorization code) that allows the user to use the secured hardware token while preventing nefarious individuals from accessing the secured hardware token.

In one or more embodiments of the invention, an n-bit generator (158) includes functionality to receive and process one or more inputs to generate an n-bit result composed of one or more message digests. In one or more embodiments of the invention, the inputs to the n-bit generator (158) include an n-bit generator input and a master secret or an identifier of a master secret. In one or more embodiments of the invention, if the input is an identifier of a master secret, the n-bit generator includes functionality to obtain the corresponding master secret from the secure persistent storage.

Further, the n-bit generator includes functionality to generate a deterministic and repeatable message digest, which appears pseudo-random or random, in accordance with one or more embodiments of the invention. A pseudo-random output (e.g., message digest) is output that is repeatable and predictable but appears random. Specifically, in one or more embodiments of the invention, although the message digest is repeatable and calculable when the inputs and the operations performed by the n-bit generator (158) are known, the message digest appears random. The apparent randomness may be with respect to someone who knows or does not know the inputs in accordance with one or more embodiments of the invention. Alternatively, or additionally, the apparent randomness may be with respect to someone who does not know the operations performed by the n-bit generator in accordance with one or more embodiments of the invention. In one or more embodiments of the invention, the message digest is deterministic in that a single output exists for a given set of inputs.

Moreover, the message digest may be a fixed length. In other words, regardless of the input length, the same n-bit generator (158) may produce a message digest with a fixed length. The n-bit generator (158) may include functionality to concatenate multiple generated message digests together to generate the n-bit result. The length of the n-bit result is configurable by the requesting application in one or more embodiments of the invention.

The number of bits in the input to the n-bit generator may be different or the same as the number of bits in the output produced by the n-bit generator. For example, if the n-bit generator accepts n number of bits for input and produces m number of bits for output, m may be less than, equal to, or greater than n. Multiple iterations of the n-bit generator may be performed to construct an ever-increasing n-bit result that includes multiple message digests.

Further, the n-bit generator (158) includes functionality to generate a deterministic message digest. Specifically, the n-bit generator (158) has the following two properties. First, the n-bit generator (158) generates the same message digest when provided with the same input(s). Second, the n-bit generator generates, with a high probability, a different message digest when provided with different input(s). For example, a single bit change in the input may result in a significant change of the bits in the resulting message digest. In the example, the change may be fifty percent of the bits depending on the type of n-bit generator used. However, a greater percentage or lesser percentage of bits may change without departing from the scope of the invention.

The n-bit generator (158) may include multiple subroutines, such as a bit shuffler (not shown) and a hash function (not shown). In one or more embodiments of the invention, the bit shuffler includes functionality to combine multiple inputs into a single output. Specifically, the bit shuffler applies a function to the bit level representation of inputs to generate a resulting set of output bits. The output of the bit shuffler may appear as a shuffling of bits in each of the inputs, and may or may not have the same ratio of 1s to 0s as the input. In one or more embodiments of the invention, the bit shuffling by the bit shuffler has a commutative property. In other words, the order that inputs are provided to the bit shuffler does not affect the output. For example, consider the scenario in which the inputs are input X, input Y, and input Z. Bit shuffling on input X, input Y, and input Z produces the same output as bit shuffling on input Y, input Z, and input X.

In one or more embodiments of the invention, the bit shuffler may correspond to any function or series of functions for combining inputs. For example, the bit shuffler may correspond to the exclusive OR (XOR) function, the multiplication function, an addition function, or another function that may be used to combine inputs. As another example, the bit shuffler may correspond to a function that orders the inputs and then uses a non-commutative function to generate an output. The bit shuffler may correspond to other mechanisms for combining multiple inputs without departing from the scope of the invention.

In one or more embodiments of the invention, a hash function is a function that includes functionality to receive an input and produce a pseudo-random output. In one or more embodiments of the invention, the hash function may include functionality to convert a variable length input into a fixed length output. For example, the hash function may correspond to GOST, HAVAL, MD2, MD4, MD5, PANAMA, SNEERU, a member of the RIPEMD family of hash functions, a member of the SHA family of hash functions, Tiger, Whirlpool, S-Box, P-Box, any other hash function, or any combination thereof.

Although the above description discusses the use of the bit shuffler prior to the hash function, in one or more embodiments of the invention, the hash function operations may be performed prior to the bit shuffler operations. For example, the hash function may be performed separately on each of the inputs to create hashed inputs. The hashed inputs may then be combined by the bit shuffler. Alternatively, the bit shuffler may be first performed on the inputs to create a single intermediate result before the intermediate result is provided to the hash function. The intermediate result may be stored to be used later to create subsequent message digests.

Continuing with FIG. 1E, in one or more embodiments of the invention, the interface (152) is a wired interface (discussed above). Alternatively, the interface (152) is a wireless interface (discussed above).

Figure 1F:
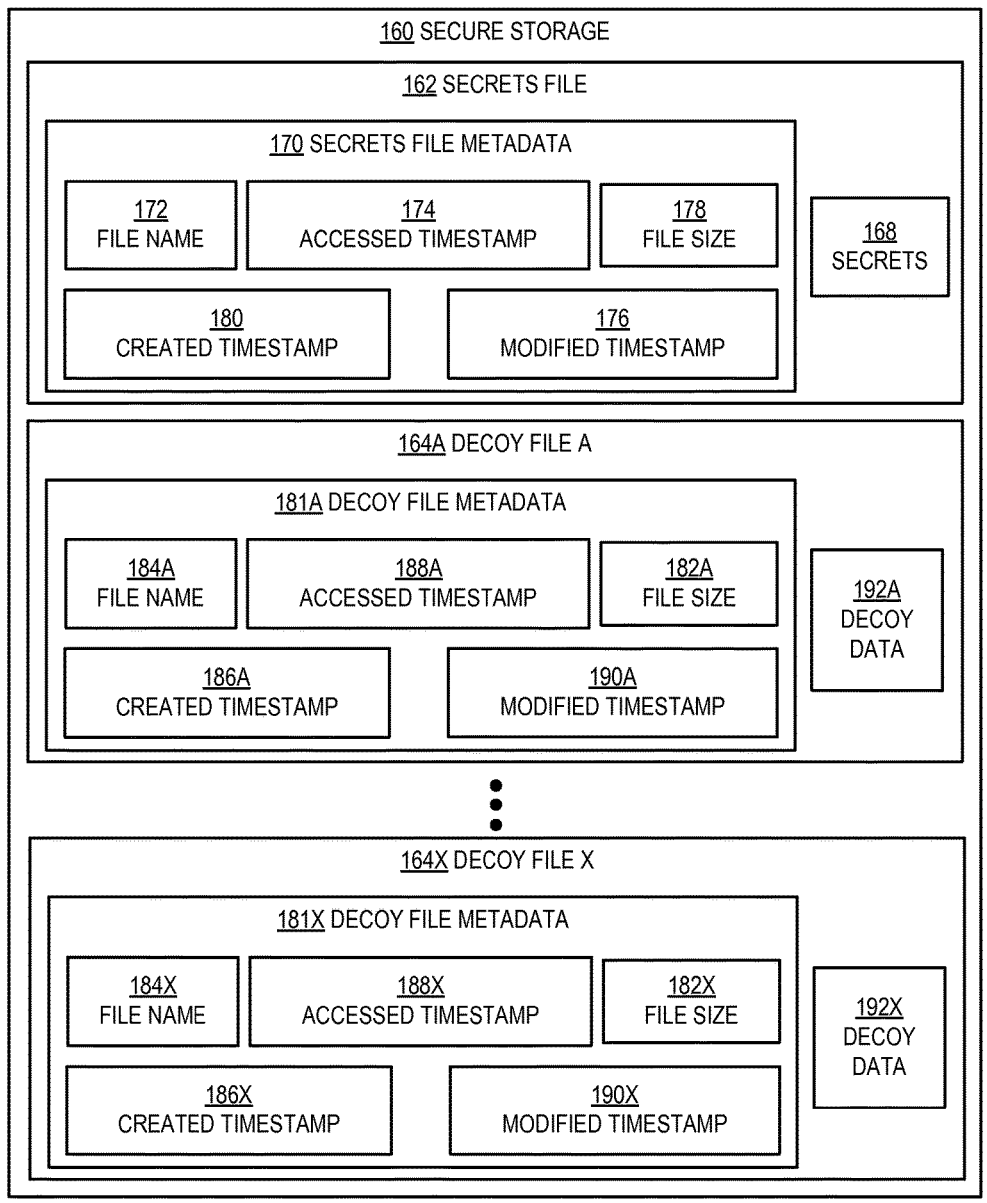
FIG. 1F shows a secure storage in accordance with one or more embodiments of the invention.

FIG. 1F shows secure storage in accordance with one or more embodiments of the invention. The secure storage (160) corresponds to any persistent storage configured to store the data shown in FIG. IF. Examples of secure storage include, but are not limited to, SD cards, microSD cards, miniSD cards, smart cards, USB flash drives, magnetic media, solid state devices, and optical storage devices.

The secure storage (160) includes one or more secrets files (162) and one or more decoy files (164A, 164X). The aforementioned files may be included in any type of directory structure which may include one or more sub-directories. Further, the secure storage (160) may include files other than secrets files and decoy files.

The secrets file (162) is a file for storing secrets (168). Secrets in the secrets file (162) are shared secrets. Shared secrets (168) correspond to data known only to the members of a group. In general, in one or more embodiments of the invention, each member of the group is an individual or a computing device. In one or more embodiments of the invention, the group is two or more members that share (or intend to share) confidential information. Each member of the group independently generates the secrets (168) using an n-bit generator (not shown) and the same group agreed seed as inputs to the n-bit generator. The group agreed seed may be any password, passphrase, or series of characters agreed upon by members of the group or their corresponding users. For example, the group agreed seed may be "the cow jumped over the moon," "#8$#DsaVA(@ 12w @," or any other collection of characters (e.g., symbols and/or alphanumeric characters).

In one or more embodiments of the invention, because each secret is generated by the n-bit generator, each secret is pseudo-random. For example, when interpreted in textual-based format, each secret appears as a random string of characters (e.g., American Standard Code for Information Exchange (ASCII) symbols or any other character set used to represent characters).

Each of the secrets (168) in the secrets file may be associated with a unique secret identifier. The unique secret identifier may be a consecutive integer specifying when the secret was generated. For example, the first generated secret may be associated with the number one, while the second generated may be associated with the number two, etc. The consecutive integer may be explicitly or implicitly associated with the secret. For example, the number one may be stored in the secrets file (162) with the first generated secret. Alternatively, the first generated secret may be in the first position in the secrets file to indirectly associate the first generated secret with the first integer.

Secrets (168) in the secrets file (162) are each associated with a given group and may be further organized according to type of communication in accordance with one or more embodiments of the invention. For example, secrets used for encryption in a chat session may be different than secrets used for encryption in an email communication. Alternatively or additionally, the secrets may be organized based on the clear text file format of a file to be encrypted. For example, secrets used to encrypt portable document format (PDF) files may be different than secrets used to encrypt extensible markup language (XML) files.

In one or more embodiments of the invention, each shared secret may include a static secret, a dynamic secret, or both a static secret and a dynamic secret. The static secret may remain unchanged throughout the lifetime of the group in accordance with one or more embodiments of the invention. For example, the static secret may be used to recover secure communications by providing a new set of secrets when the members of the group lose synchronization with regards to the dynamic secrets. In contrast, the dynamic secret may periodically change, such as at the end of each communication session or prior to beginning a communication session.

In one or more embodiments of the invention, a communication session may be a set of related communications (e.g., related short messaging service messages (SMS), related emails, chat messages, or other related communications). Alternatively, or additionally, a communication session may correspond to a set of communications starting at a first time and having a duration of a pre-defined amount of time. The pre-defined amount of time may be defined, for example, according to the amount of time after the last communication is sent and/or received.

In one or more embodiments of the invention, secrets (168) are protected in the secrets file. The protection of the secrets (168) may be performed by encrypting the file. Specifically, the secrets file (162) may have an encryption key (not shown) associated with the secrets file (162).

In addition to secrets (168), the secrets file (162) also includes secrets file metadata (170). The secrets file metadata (170) includes information about the secrets file (162). As shown in FIG. 1F, the secrets file metadata (170) may include a file name (172), a created timestamp (180), an accessed timestamp (174), a modified timestamp (176), and a file size (178).

The file name (172) is the unique identifier of the file within the secure storage (160). In one or more embodiments of the invention, the file name appears randomly generated. Specifically, the file name (172) is a pseudo-random string of characters (e.g., symbols and/or alphanumeric characters) of a pre-defined length. The file name (172) may be generated by the n-bit generator and may be converted to a textual based format.

The created timestamp (180) specifies when the secrets file (162) was created. If the secrets file (162) is a copy of an original secrets file (162), then the created timestamp (180) specifies when the copy was created. Similarly, the accessed timestamp (174) specifies when the secrets file (162) was last accessed by the user or the program. For example, the accessed timestamp (174) may correspond to the last time in which the secrets file (162) was opened. The modified timestamp (176) specifies when the secrets file (162) was last modified. Specifically, the modified timestamp (176) specifies when a change was saved to the secrets file (162). The file size (178) provides the size of the secrets file (162). Specifically, the file size (178) may specify, for example, the amount of physical storage space required to store the secrets file.

In addition to the secrets file (162), the secure storage (160) also includes decoy files (e.g., 164A, 164X) in accordance with one or more embodiments of the invention. In one or more embodiments of the invention, the decoy files (e.g., 164A, 164X) are indistinguishable from the secrets file (162). Specifically, like the secrets file (162), the decoy files include metadata (e.g., 181A, 181X) and file size data (e.g., 182A, 182X). The decoy file metadata (e.g., 181A, 181X) may include a file name (e.g., 184A, 184X), a created timestamp (e.g., 186A, 186X), accessed timestamp (e.g., 188A, 188X), modified timestamp (e.g., 190A, 190X), and file size (e.g., 182A, 182X).

In one or more embodiments of the invention, the file name (e.g., 184A, 184X) of the decoy files (e.g., 164A, 164X) are similar to the file name (172) of the secrets file (162). Specifically, like the secrets file name (172), the decoy file name (e.g., 184A, 184X) is a pseudo-random string of characters. Further, the decoy file name (e.g., 184A, 184X) includes only characters that may be present in the secrets file name (172). For example, if the secrets file name (172) includes only alphanumeric characters, then the decoy file names (e.g., 184A, 184X) also only include alphanumeric characters. Further, for example, if the secrets files name contains 8 alphanumeric characters, the decoy file names will contain 8 alphanumeric characters. Thus, the secrets file name (172) appears indistinguishable in its form of construction from the decoy file names (e.g., 184A, 184X).

Further, in one or more embodiments of the invention, the created timestamp (e.g., 186A, 186X), the accessed timestamp (e.g., 188A, 188X), the modified timestamp (e.g., 190A, 190X), and the file size (e.g., 182A, 182X) of the decoy files (e.g., 164A, 164X) are respectively indistinguishable to created timestamp (180), accessed timestamp (174), modified timestamp (176), and the file size (178) of the secrets file (162). Rather than being completely identical, the aforementioned components may be substantially identical (e.g., have only a difference of a few seconds or milliseconds). Moreover, the values of the aforementioned components of the secrets file (162) are within the range of values of the aforementioned components of the various decoy files (e.g., 164A, 164X). For example, if the modified timestamp of the secrets file is 10:21:45 AM on Aug. 1, 2010, the modified timestamp of the decoy files may range from 10:21:36 AM on Aug. 1, 2010 to 10:21:59 AM on Aug. 1, 2010. A broader or more narrow range of timestamps may exist without departing from the scope of the invention.

Similar to the file name (e.g., 184A, 184X) of the decoy files (e.g., 164A, 164X) and the file name (172) of the secrets file (162), the decoy data (e.g., 192A, 192X) appears indistinguishable to the secrets (168). In particular, the decoy data (e.g., 192A, 192X) has the same apparent randomization of characters as the secrets. Further, if the secrets file is partitioned into secrets (e.g., static and dynamic secrets), then the decoy data is also partitioned into strings of the same number of characters as the secrets. Similarly, if the secrets file includes identifiers, then the decoy data also includes similar identifiers. Thus, the decoy data (e.g., 192A, 192X) includes the same amount in terms of size, same identifier, same file structure and the same apparent randomization of characters as the secrets (168) in accordance with one or more embodiments of the invention. The decoy data (e.g., 192A, 192X) may be encrypted, for example, using the same encryption algorithm to encrypt the secrets (168).

Although FIG. 1F shows the secrets file (162) as the first file, the secrets file (162) may be intermingled among the decoy files (e.g., 164A, 164X). For example, the ordering of the files within the secrets directory does not account for the fact that the secrets file is a secrets file. Thus, the secrets file (162) is not in a pre-defined position within the secrets directory. In one or more embodiments of the invention, the files may be ordered alphanumerically in accordance with the file management system being implemented in the secure storage.

FIGS. 1G-1J show flow diagrams in accordance with one or more embodiments of the invention. While the various steps in these flow diagrams are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent or not consistent with the tested condition in accordance with one or more embodiments of the invention. Many different types of software statements or hardware circuits may be used to perform the various steps of FIGS. 1G-1J. The different equivalent statements or circuits that achieve same or similar results are included within the scope of the invention.

Figure 1G:
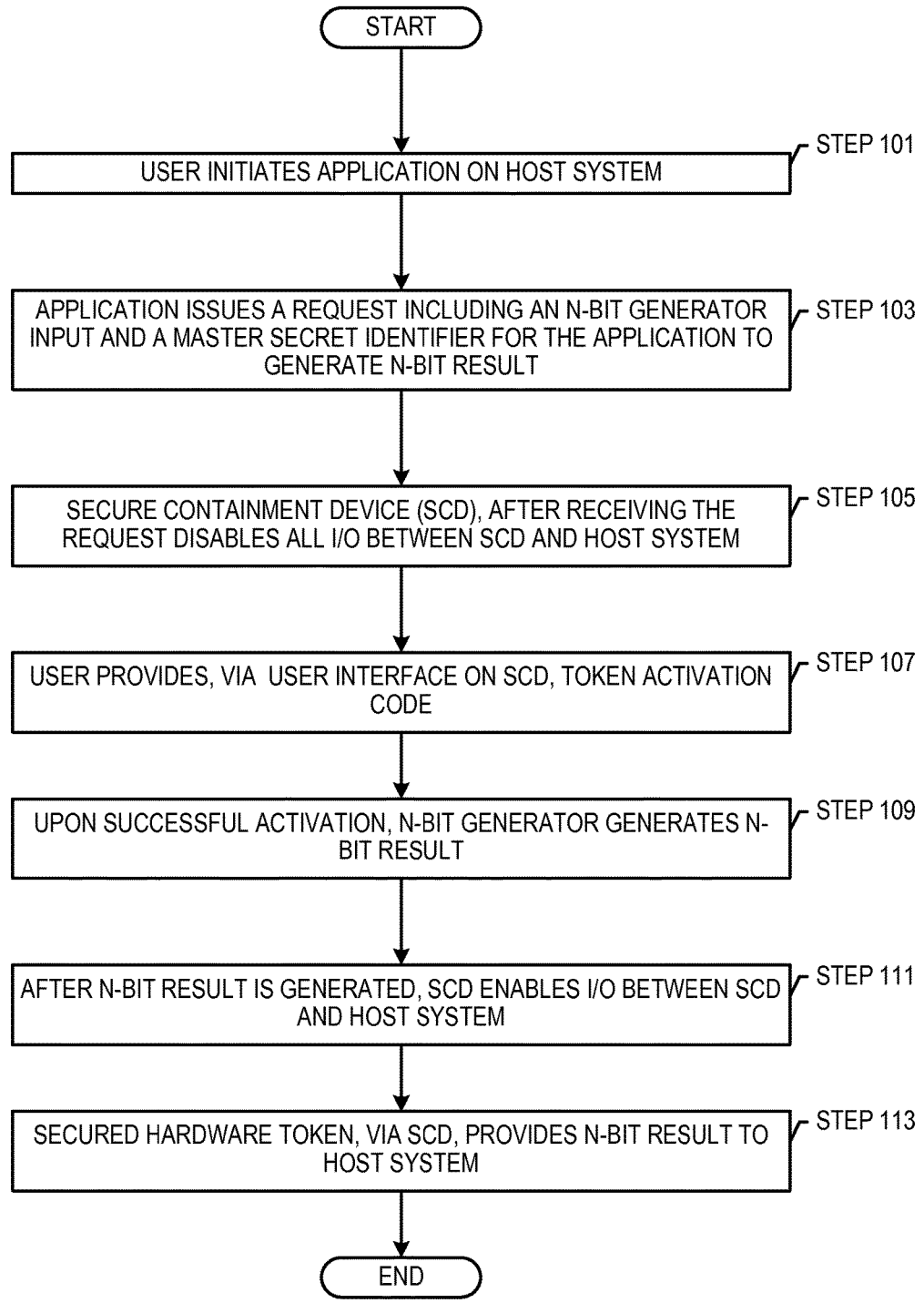
FIGS. 1G-1J show flow diagrams for using a secure containment device in accordance with one or more embodiments of the invention.

Turning to FIG. 1G, FIG. 1G shows a flow diagram in accordance with one or more embodiments of the invention. More specifically, FIG. 1G shows a flow diagram of an SCD interacting with a secured hardware token to generate an n-bit result in accordance with one or more embodiments of the invention.

In Step 101, the user initiates an application on the host system. In one or more embodiments of the invention, the application may be any application that uses an n-bit result. The particular use of the n-bit result may vary based on the nature of the application. For example, the application may use the n-bit result to encrypt data, decrypt data, access data, or generate a digital signature. Those skilled in the art will appreciate that the uses of the n-bit result are not limited to the examples above.

In Step 103, the application issues a request for an n-bit result to the n-bit generator, where the request includes an n-bit generator input and a master secret identifier corresponding to the application master secret.

In Step 105, upon receipt of the request, the SCD disables all I/O interfaces between the SCD and the host system. In one or more embodiments of the invention, the SCD may disable all I/O interfaces except the I/O interface between the SCD and the secured hardware token.

In Step 107, in response to a prompt from the SCD, the user provides, via a user interface on the SCD, a token activation code (TAC). In one or more embodiments of the invention, the TAC is a password/phrase used to activate the token and may be represented as a numeric, alpha only or alphanumeric value. The TAC input may be one or more of the following formats: (i) ASCII; (ii) Universal Character Set (UCS) defined by ISO/IEC 10646; and (iii) Unicode. Those skilled in the art will appreciate that the TAC may be in any language and/or any format without departing from the invention. In one or more embodiments of the invention, the SCD provides the TAC to the secured hardware token over the I/O interface between the SCD and the secured hardware token.

In Step 109, upon successful activation of the secured token, the n-bit generator generates the n-bit result using the master secret identifier and the n-bit generator input (which were included in the request in Step 103). In one or more embodiments of the invention, the secured token is successfully activated when the TAC provided by the user matches the TAC stored in the secured hardware token. In one or more embodiments of the invention, the master secret identifier and the n-bit generator input are provided by the SCD to the secured hardware token upon receipt of the request. Alternatively, the master secret identifier and the n-bit generator input are provided by the SCD to the secured hardware token upon successful authentication of the secured hardware token.

In Step 111, after the n-bit result is generated, the SCD enables at least the I/O interface between the SCD and the host system. In Step 113, the secured hardware token provides the n-bit result, via the SCD, to the host system.

In one or more embodiments of the invention, the/O interface between the SCD and the secured hardware token may not be active while the I/O interface between the SCD and the host system is active. In another embodiment of the invention, the I/O interface between the SCD and the secured hardware token may not be active while any other I/O interfaces on the SCD are active.

In one or more embodiments of the invention, disabling the various I/O interfaces requires the SCD to detect and/or determine what (if anything) is connected to each of the I/O interfaces. Based on this information, the SCD can disable the appropriate I/O interfaces.

In one or more embodiments of the invention, the SCD may be configured such that the host system may only connect to the SCD over a particular I/O interface and the secured hardware token, and/or the secure storage may only connect to the I/O interface over another particular I/O interface(s). In this scenario, the I/O interface used to connect to the host system may be of a certain type which is different from the type of I/O interface that the secured token and/or the secure storage may use to connect to the SCD. For example, the host system may use a USB interface, the secure storage may use a Bluetooth interface, and the secured token may use a miniSD interface, or any other combinations of interfaces.

In another embodiment of the invention, the SCD includes functionality to identify to which I/O interface the secure storage and/or the secured hardware token are connected. In one or more embodiments of the invention, when a device is connected to an I/O interface on the SCD, the SCD includes functionality to query the device to determine the type of device. In one or more embodiments of the invention, the secured hardware token includes a digital certificate issued by a trusted third party, which identifies the device as the secured hardware token. In such cases, the SCD may query the device, for example using a plug and play query, for a digital certificate. If the device responds with a digital certificate and the SCD can verify that the digital certificate identifies the secured hardware token as a secured hardware token, then the SCD identifies the I/O interface which is connected to the secured hardware token. If the device does not include a digital certificate or the digital certificate is not valid or has expired, then the SCD does not associate the I/O interface with the secured hardware token. Those skilled in the art will appreciate that other forms of authentication may be used in place of a digital certificate without departing from the invention.

In one or more embodiments of the invention, the SCD does not need to identify what is connected to each I/O interface; rather, the SCD only identifies to which of its I/O interfaces the secured hardware token is connected.

Those skilled in the art will appreciate that while the above discussion focuses on secured hardware tokens, the above embodiments may be extended to secured storage without departing from the invention.

In one or more embodiments of the invention, the SCD may include functionality to limit the type of host systems to which it may be connected. For example, the SCD may only allow connections with host systems that are on a pre-defined list, are executing a particular operating system, implementing a particular type of hardware, implementing a particular type of authentication, implementing a particular type of software application, or any combination thereof.

In one or more embodiments of the invention, the SCD may include functionality to verify whether the host system connected to a given I/O interface satisfies a particular set of requirements of the SCD (as described above). The SCD may verify that the host system satisfies a particular set of requirements by obtaining a digital certificate from a host system, where the digital certificate is issued by a trusted third party and the third party has independently verified that the host system satisfies the requirements of the SCD. Alternatively, the SCD may directly query the host system to determine if the host system satisfies the requirements of the SCD. In such cases, the SCD may issue one or more requests to the host system to verify various characteristics of the host system and then, based on a successful determination that the host system satisfies the SCD requirements, allow the host system to connect to the SCD.

In one or more embodiments of the invention, the SCD may disable I/O interfaces at the hardware level or the software level. More specifically, the SCD may include functionality to stop power from being supplied to I/O interfaces that it has disabled. Alternatively, the instructions executed by the processor or operation of the integrated circuit on the SCD may prevent data from being sent or received by the disabled I/O interfaces. Those skilled in the art will appreciate that other mechanisms for disabling the I/O interfaces may be implemented without departing from the invention.

Those skilled in the art will appreciate that disabling all I/O interfaces on the SCD may include disabling the I/O interface to a pointing device (or equivalent device). Alternatively, the SCD may include functionality to identify over which I/O interface the pointing device (or equivalent device) is connected, and not disable the corresponding I/O interface.

Further, those skilled in the art will appreciate that if the SCD is connected to an external display and/or an external keyboard/keypad and the SCD requires the display and/or the external keyboard/keypad to perform one or more steps shown in FIGS. 1G-1J, the I/O interfaces connected to the external display and/or external keyboard/keypad are not disabled when the SCD disables all of the other I/O interfaces. In such cases, the following I/O interfaces may be active when all other I/O interfaces are disabled: (i) I/O interface to a secure storage or the secured hardware device, (ii) the I/O interface to an external display (if present) and (iii) the I/O interface to an external keyboard/keypad (if present).

Figure 1H:
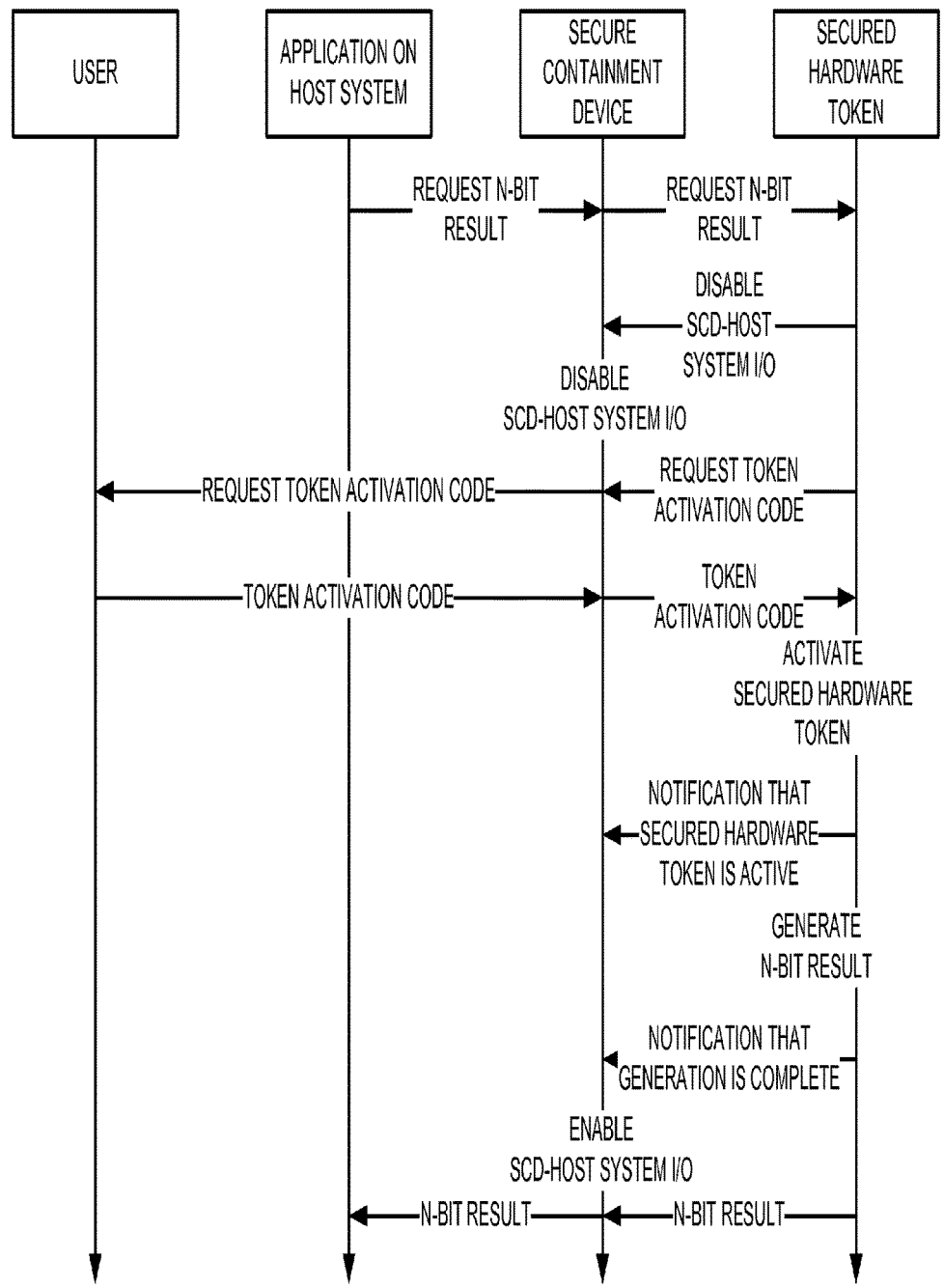

FIG. 1H shows a flow diagram in accordance with one or more embodiments of the invention. FIG. 1H shows the interaction between various components and entities in the system in accordance with one or more embodiments of the invention.

Turning to FIG. 1H, initially, an application on the host system issues a request (including an n-bit generator input and master secret identifier) for an n-bit result to a SCD. The SCD forwards the request to the secured hardware token. The secured hardware token sends a request to the SCD to disable at least the SCD-Host system I/O interface. The SCD subsequently disables the SCD-Host system I/O interface. In one or more embodiments of the invention, the SCD may disable all I/O interfaces except the I/O interface between the SCD and the secured token.

Once the I/O interface(s) have been disabled, the secured hardware token sends a request to the SCD for a token activation code (TAC). The SCD prompts the user, via a display on the SCD, for the TAC. The user enters, via the user interface (e.g., keypad, keyboard, virtual keypad, virtual keyboard, display, and/or pointing device, etc.) on the SCD, the TAC. The SCD subsequently provides the TAC to the secured hardware token.

The secured hardware token subsequently uses the TAC to activate the secured hardware token. The secured hardware token notifies the SCD of successful activation. Though not shown in FIG. 1H, the SCD may notify the user via a notification on the display on the SCD. Once successfully activated, the secured hardware token generates the n-bit result using the n-bit generator input and the master secret identifier. Once generated, the secured token notifies the SCD to enable at least the I/O interface between the SCD and the host system. Once enabled, the secured token sends the n-bit result to the SCD. The SCD subsequently sends the n-bit result to the application on the host system.

Figure 1I:
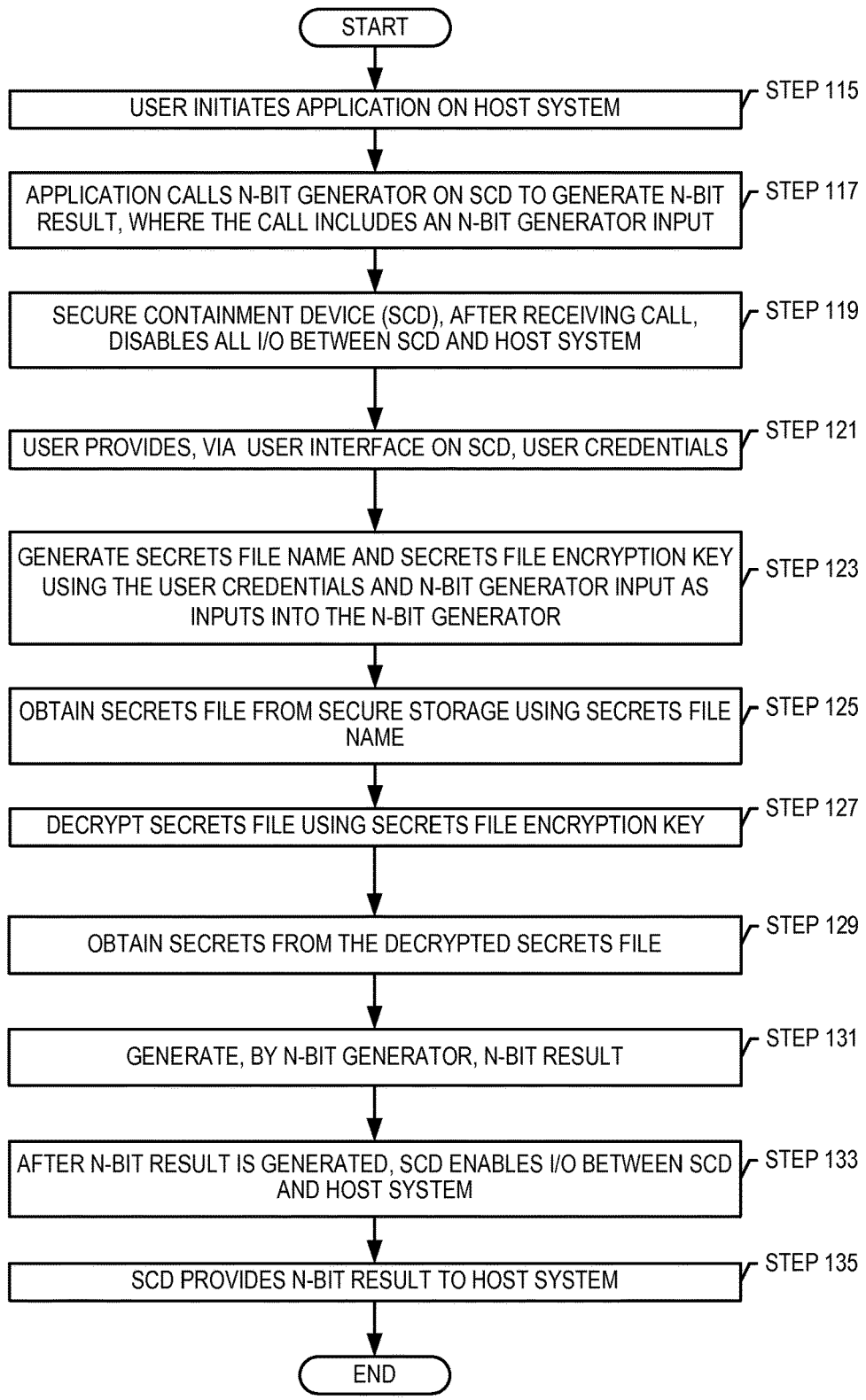

Turning to FIG. 1I, FIG. 1I shows a flow diagram in accordance with one or more embodiments of the invention. More specifically, FIG. 1I shows a flow diagram of an SCD interacting with a secure storage to generate an n-bit result in accordance with one or more embodiments of the invention.

In Step 115, the user initiates an application on the host system. As discussed above, the application may be any application that uses an n-bit result. The particular use of the n-bit result may vary based on the nature of the application.

In Step 117, the application issues a request for an n-bit result to the n-bit generator on the SCD. In one or more embodiments of the invention, the request includes an n-bit generator input. In one or more embodiments of the invention, the n-bit generator input is a group agreed connect name. In one or more embodiments of the invention, a group agreed connect name is an identifier of the group used by all of the members. Specifically, each member of the group associates the same group agreed connect name with the group. The group agreed connect name may be an alphanumeric value which would be very difficult to memorize. Because all members associate the same group with the same group agreed connect name, the group agreed connect name may be used by a member of the group when triggering the start of a communication session with other members of the group.

In Step 119, upon receipt of the request, the SCD disables all I/O interfaces between the SCD and the host system. In one or more embodiments of the invention, the SCD may disable all I/O interfaces except the I/O interface between the SCD and the secured hardware token.

In Step 121, the user provides user credentials to the SCD via a user interface (e.g., keypad, keyboard, virtual keypad, virtual keyboard, display, and/or pointing device, etc.) on the SCD. In one or more embodiments of the invention, the user provides the user credentials in response to a prompt from the SCD. In one or more embodiments of the invention, user credentials may include, for example, a username and password, biometric data, any other form of user credential, or any combination thereof. Other forms of user credentials may be used without departing from the scope of the invention.

In Step 123, a secrets file name and a secrets file encryption key are generated using the user credentials and the group agreed connect name. More specifically, in one or more embodiments of the invention, a first message digest is generated using the group agreed connect name and the user credentials as inputs into the n-bit generator. The n-bit generator generates the first message digest by applying the operations of the n-bit generator to the input values.

The secrets file name and the secrets file encryption key are extracted from the message digest. Specifically, the SCD identifies each portion of the message digest corresponding to a secrets file name and a secrets file encryption key. For example, in a 512-bit message digest, bits in bit positions 0-255 may correspond to the secrets file name, bits in bit positions corresponding to 256-383 may correspond to the secrets file encryption key, and the final 128 bits may correspond to discard bits that remain unused. In one or more embodiments of the invention, because the user credentials are part of the input in Step 121, with a high probability, a different message digest is generated by each member of the group. Thus, the secrets file name and the secrets file encryption key are different for each member of the group. Thus, a nefarious individual or computer system cannot correlate file names on different member's systems to identify the secrets file or decrypt an encrypted secrets file using a secrets file encryption key generated by another member.

In Step 125, a secrets file is obtained from the secure storage using the secrets file name. In Step 127, the obtained secrets file is decrypted using the secrets file encryption key. In Step 129, the secret(s) (which may also be referred to as a master secret(s)) is obtained from the decrypted secrets file. In Step 131, an n-bit result is generated using the n-bit input and the master secret(s). In one or more embodiments of the invention, the secrets file may not be encrypted, and, thus, Step 127 may be omitted without departing from the scope of the invention.

In Step 133, after the n-bit result is generated, the SCD enables at least the I/O interface between the SCD and the host system. In Step 135, the SCD provides the n-bit result to the host system.

Figure 1J:
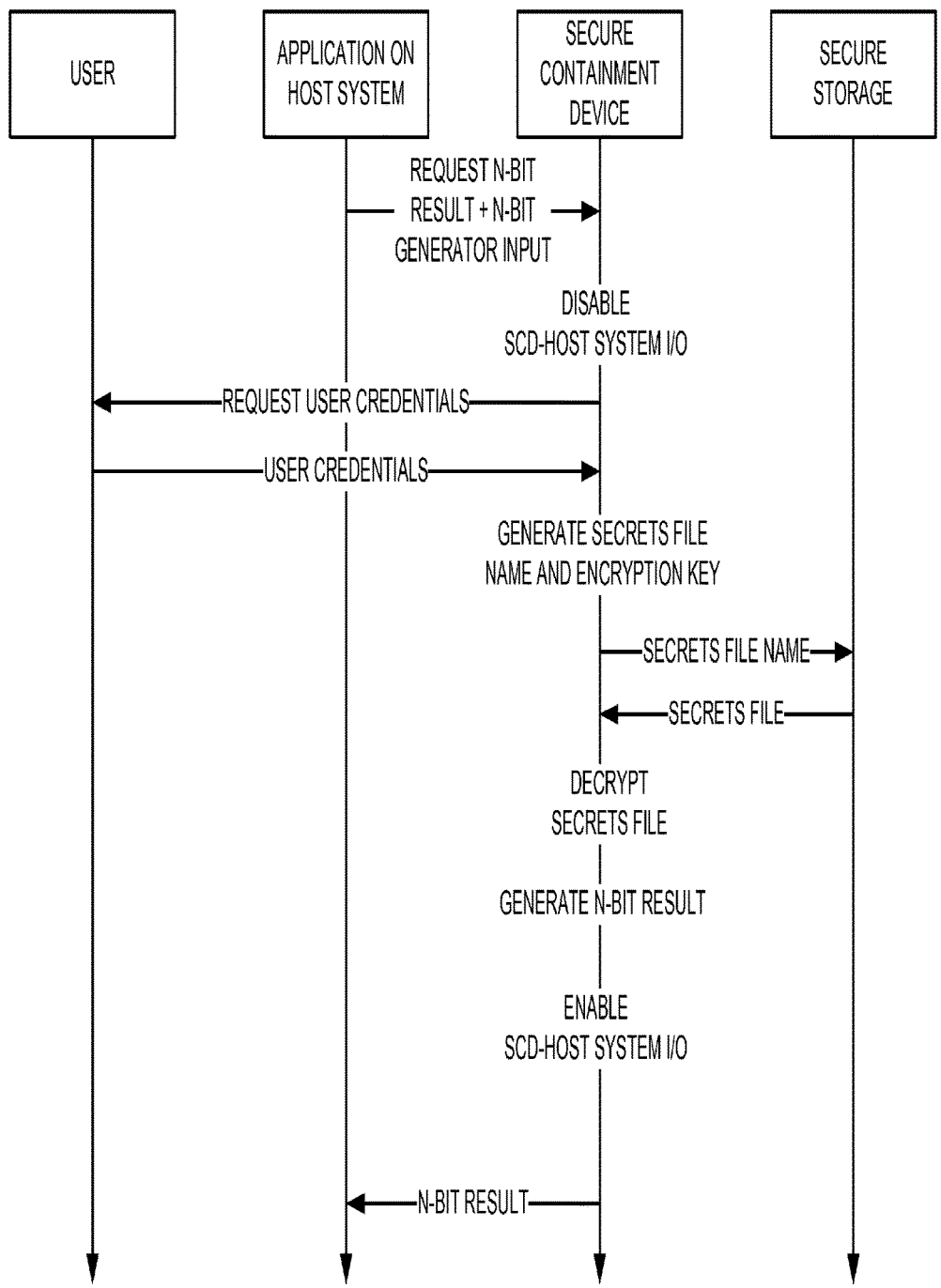

FIG. 1J shows a flow diagram in accordance with one or more embodiments of the invention. FIG. 1J shows the interaction between various components and entities in the system in accordance with one or more embodiments of the invention.

Turning to FIG. 1J, initially, an application on the host system issues a request for an n-bit result to the SCD, where the request includes an n-bit generator input. The SCD upon receipt of the request disables at least the I/O interface between the SCD and the host system. In one or more embodiments of the invention, the SCD may also disable all other I/O interfaces except the I/O interface between the SCD and the secured storage.

Once the I/O interface(s) is disabled, the SCD sends a request to a user, via a display on the SCD, for user credentials. The user, in response to the request, inputs user credentials (via the user interface on the SCD). The SCD uses the user credentials and n-bit generator input as input into an n-bit generator to generate a secrets file name and secrets file encryption key. The secrets file name is used to obtain the secrets file from the secure storage.

Upon receipt of the secrets file by the SCD, the secrets file is decrypted using the secrets file encryption key. The secret(s) in the secrets file is then used as input into an n-bit generator to generate an n-bit result. Once the n-bit result is generated, SCD enables at least the I/O interface between the SCD and the host system. Once the I/O interface is enabled, the n-bit result is sent to the application on the host system.

Those skilled in the art will appreciate that prior to enabling the SCD-Host System I/O interface (as described above in FIGS. 1G-1J above), all copies in any temporary or persistent storage (excluding the secure storage) of the decrypted files, secrets file, secrets file encryption key, user credentials, n-bit generator inputs, and decryption key (collectively "secure information") are removed from the SCD. In one or more embodiments of the invention, removing the secure information includes erasing all copies and overwriting the regions in memory (volatile and non-volatile) that included the aforementioned copies. In one or more embodiments of the invention, the overwriting may be performed in accordance with standards set by the Department of Defense, set by the National Security Agency, and/or set by any other intelligence or defense agency within the USA or a foreign government.

Figure 2A:
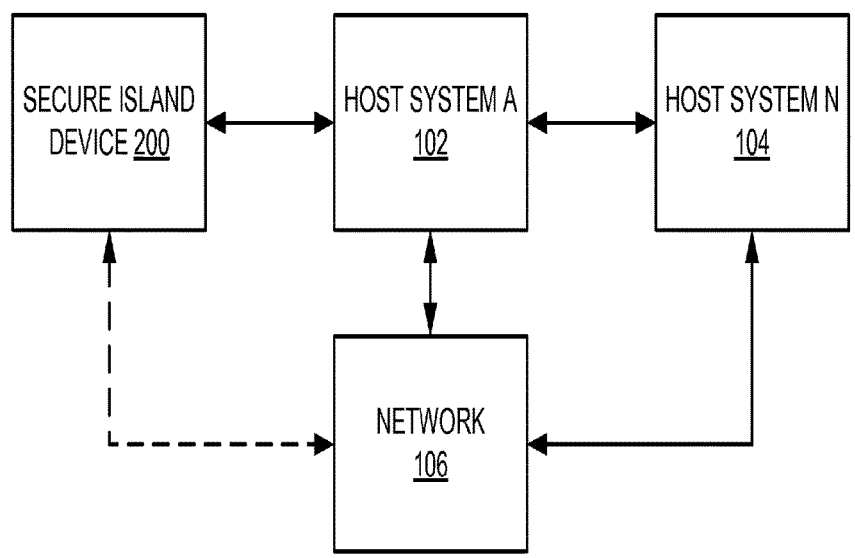
FIG. 2A shows a system in accordance with one or more embodiments of the invention.

FIG. 2A shows a system in accordance with one or more embodiments of the invention. The system includes a secure island device (SID) (200), host systems (e.g., Host system A (102), Host system N (104)), and network (106). The like-numbered components shown in FIG. 2A are described above with respect to FIG. 1A.

In one or more embodiments of the invention, the SID corresponds to any device configured to perform the functions (and/or store data) as described below with respect to FIGS. 2F-2I. Four exemplary SIDs are described below in FIGS. 2B-2E. In general, referring to FIG. 2A, the SID (200) includes functionality to connect (in a wired and/or wireless manner) with a host system (e.g., Host system A (102)). In addition, the SCD may include functionality to connect (in a wired and/or wireless manner) with network (106). In one or more embodiments of the invention, the SID may be implemented as a smart phone that is modified to perform the functionality described in FIGS. 2F-2I. In one or more embodiments of the invention, the SID may be implemented as a tablet device that is modified to perform the functionality described in FIGS. 2F-2I. In one or more embodiments of the invention, the SID may be implemented as a small footprint computing device (e.g., netbook) that includes the components shown in FIGS. 2B-2E and the functionality described in FIGS. 2F-2I). Those skilled in the art will appreciate that the invention is not limited to the embodiments discussed above.

Those skilled in the art will appreciate that modifying the aforementioned devices to obtain the SCD may include modifying hardware, firmware, and/or software on the aforementioned devices.

FIGS. 2B-2E show various embodiments of a SID. The implementation of the SID is not limited to the embodiments shown in FIGS. 2B-2E.

Figure 2B:
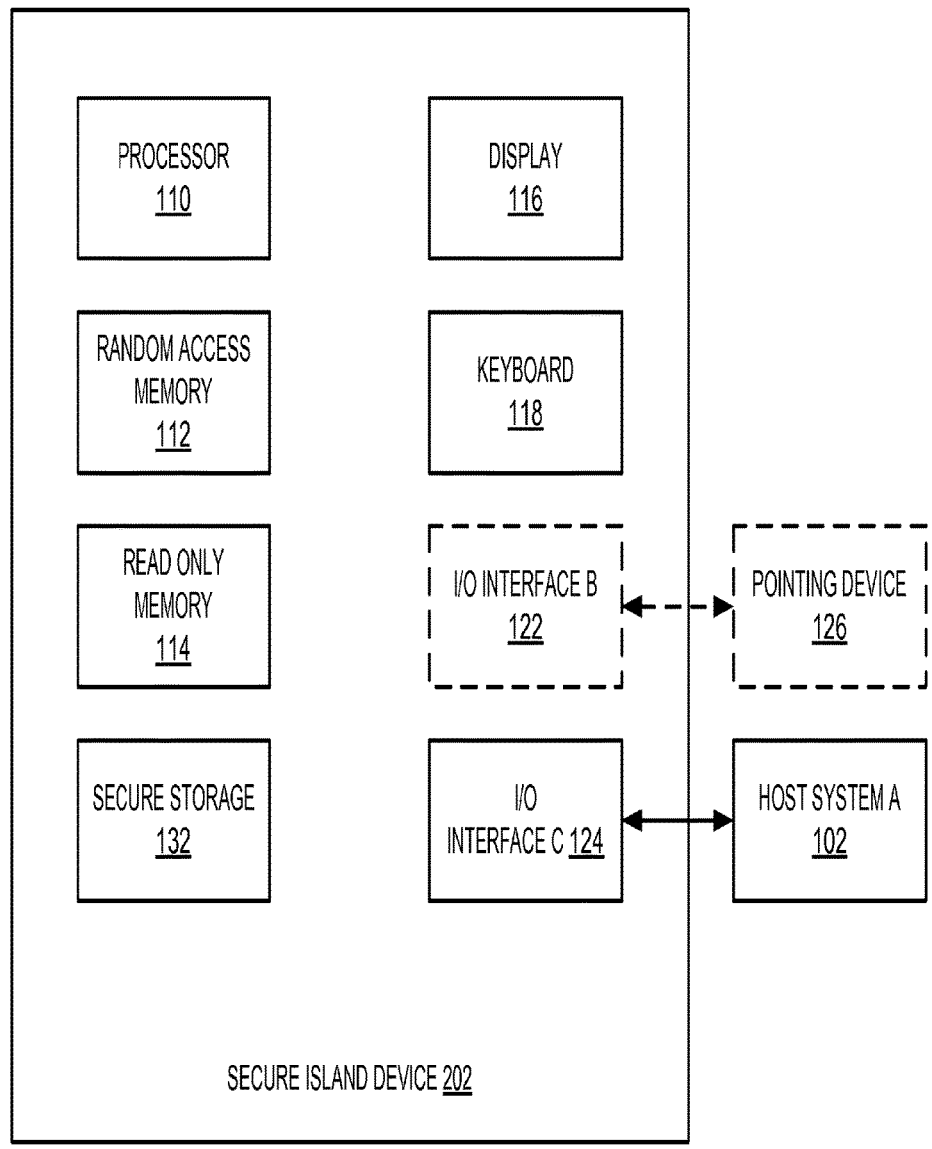
FIGS. 2B-2E show secure containment devices (SCDs) in accordance with one or more embodiments of the invention.

Turning to FIG. 2B, the SID (202) includes a processor (110), random access memory (112), read-only memory (114), a display (116), a keyboard (118), I/O interfaces (122, 124), and a secure storage (132). The like-numbered components shown in FIG. 2B are described above with respect to FIGS. 1B-1D.

As shown in FIG. 2B, the secure storage is integrated into the SID. The files in the secure storage (132) may be accessed by other components on the SID as described below in FIGS. 2F-2I. In one or more embodiments of the invention, the read-only memory (114) includes executable instructions for generating n-bit results as well as executable instructions to isolate the SID (as described below in FIGS. 2F-2I) and executable instructions to remove secure information from the SID (as described below in FIGS. 2G-2I).

Figure 2C:
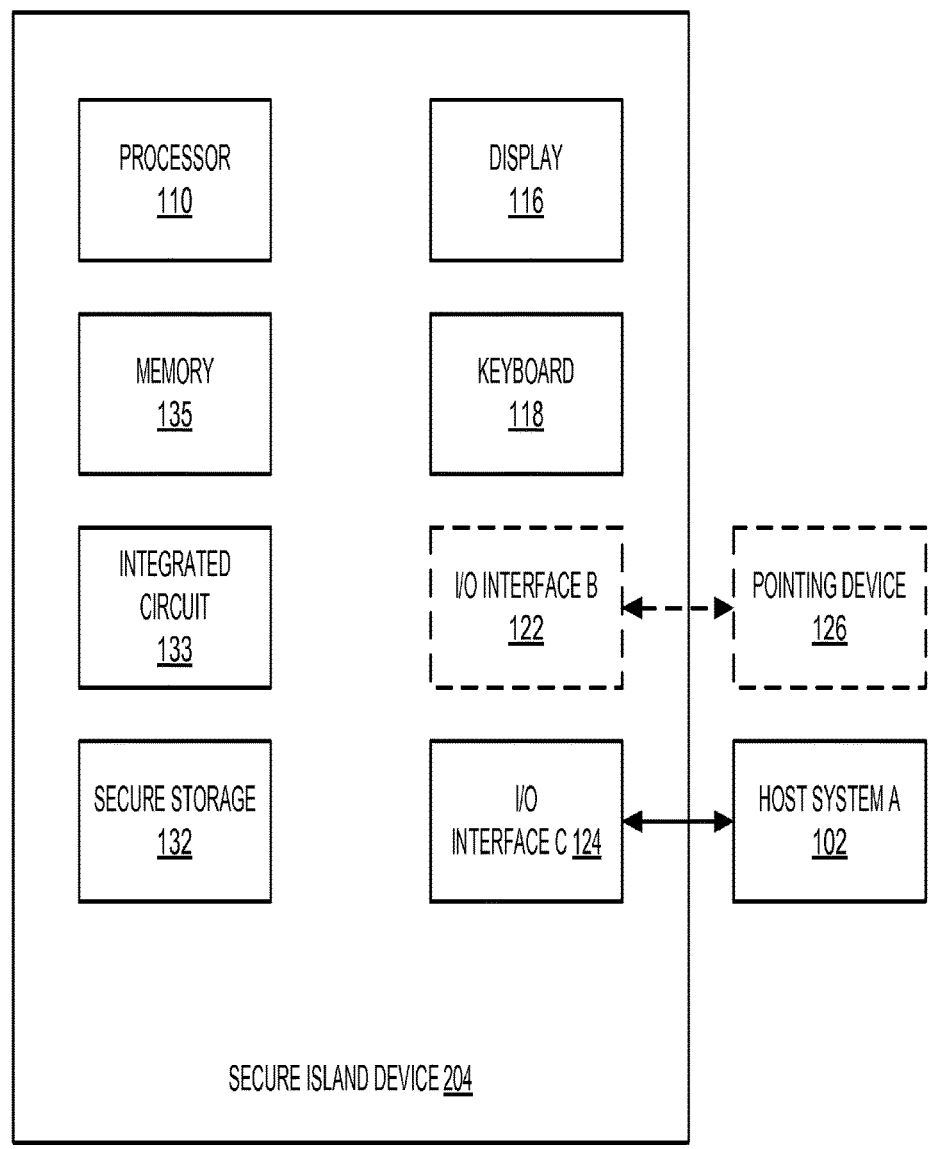

Turning to FIG. 2C, the SID (204) includes a processor (110), memory (135), a display (116), a keyboard (118), I/O interfaces (122, 124), secure storage (132), and an integrated circuit (133). The like-numbered components shown in FIG. 2C are described above with respect to FIGS. 1B-1D.

As shown in FIG. 2C, the secure storage is integrated into the SID. The files in the secure storage (132) may be accessed by other components on the SID as described below in FIGS. 2F-2I. In one or more embodiments of the invention, the memory (135) includes executable instructions to isolate the SID (as described below in FIGS. 2F-2I) and executable instructions to remove secure information from the SID (as described below in FIGS. 2G-2I). In one or more embodiments of the invention, the memory (135) includes both read-only memory and random access (or other volatile) memory. The read-only memory is configured to store the aforementioned executable instructions, and the random access memory is configured to temporarily store data that is generated by the execution of the instructions in the read-only memory. In one or more embodiments of the invention, the integrated circuit (133) includes one or more circuits configured to generate n-bit results.

Figure 2D:
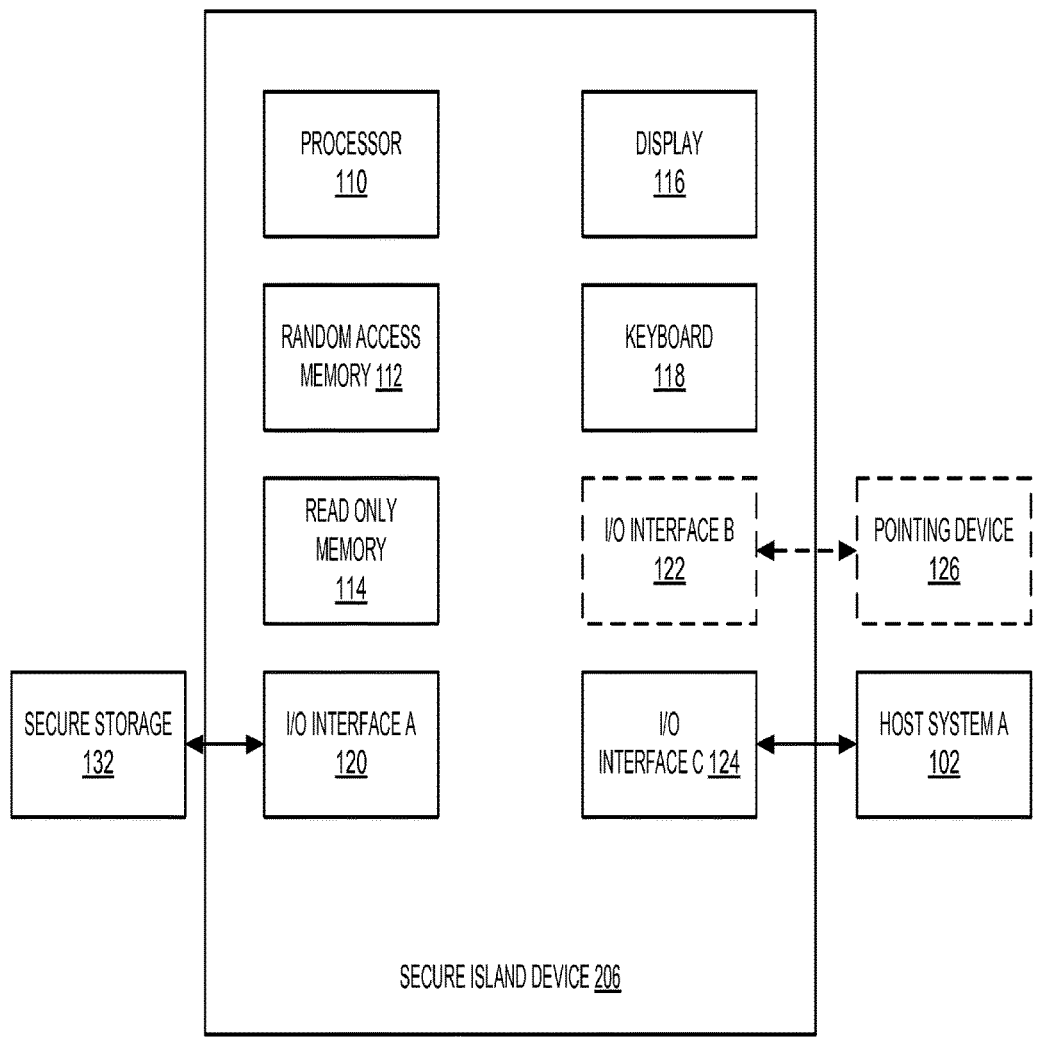

Turning to FIG. 2D, the SID (206) includes a processor (110), random access memory (112), read-only memory (114), a display (116), a keyboard (118), and I/O interfaces (120, 122, 124). The like-numbered components shown in FIG. 2D are described above with respect to FIGS. 1B-1D.

As shown in FIG. 2D, the SID (206) is similar to the SID (202) shown in FIG. 2B, except that the SID (206) interfaces with the secure storage (132) via an I/O interface (120). Those skilled in the art will appreciate that a SID may be configured to include secure storage as well as connect to external secure storage without departing from the invention.

Figure 2E:
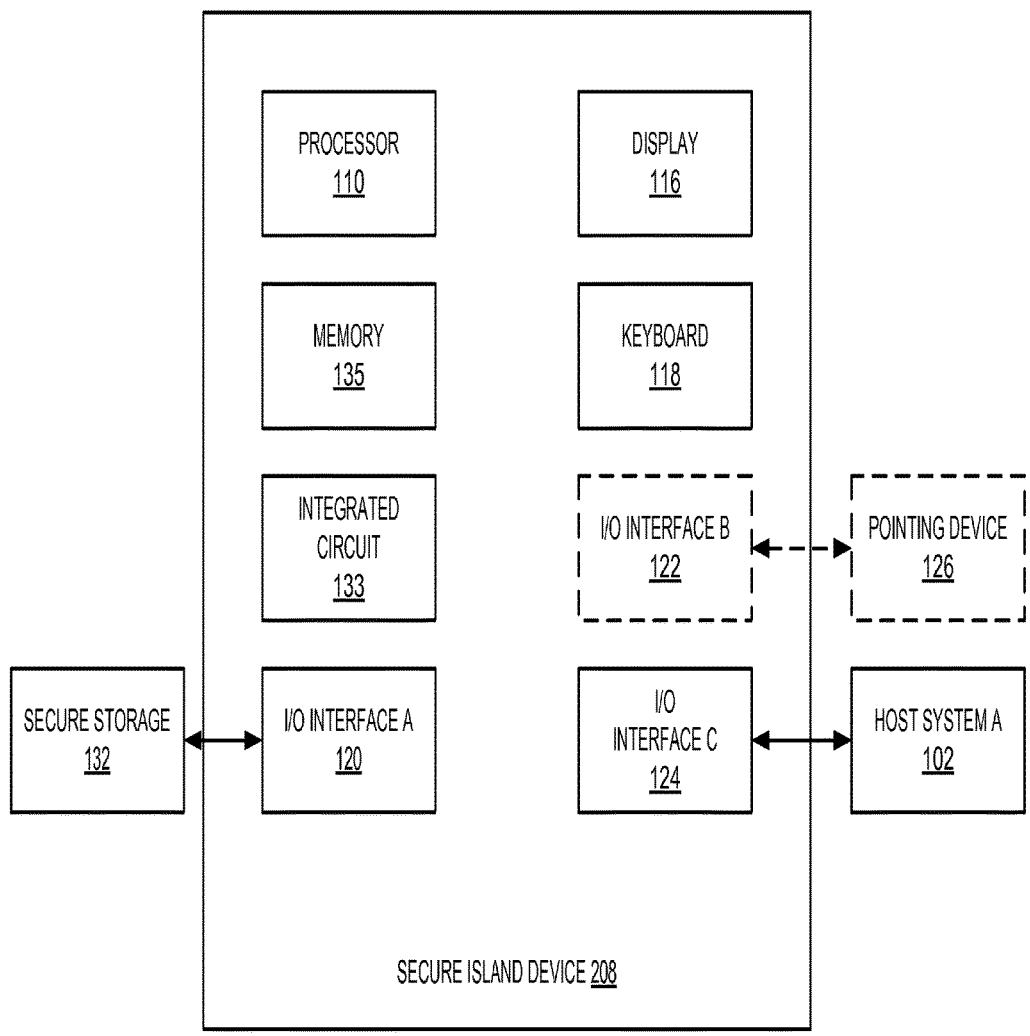

Turning to FIG. 2E, the SID (208) includes a processor (110), memory (135), a display (116), a keyboard (118), I/O interfaces (120, 122, 124), secure storage (132), and an integrated circuit (133). The like-numbered components shown in FIG. 2E are described above with respect to FIGS. 1B-1D.

As shown in FIG. 2E, the SID (208) is similar to the SID (204) shown in FIG. 2C except that the SID (208) interfaces with the secure storage (132) via I/O interface A (120). Those skilled in the art will appreciate that a SID may be configured to include secure storage as well as connect to external secure storage without departing from the invention.

Depending on the implementation of the SID, the SID may include an operating system and one or more applications. The complexity of the operating system as well as the number and type of application(s) on the SID may vary based on the processing power of the SID and, optionally, the requirements of the application(s) executing on the SID. In such cases, the operating system may be located in the read-only memory of the SID or, alternatively, in persistent storage that is readable/writeable.

Those skilled in the art will appreciate that while the various embodiments of the SIDs shown in FIGS. 2B-2E include various types of memory (e.g., read-only memory and random access memory), that the SIDs may also include L1 cache, L2 cache, other volatile memory, and non-volatile memory that is readable/writable without departing from the invention.

Those skilled in the art will appreciate that while the FIGS. 2B-2E showed embodiments of the SCD that include an embedded display and keyboard/keypad, the SCD may include an external display and/or an external keypad/keyboard without departing from the invention.

FIGS. 2F-2I show flow diagrams in accordance with one or more embodiments of the invention. While the various steps in these flow diagrams are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent or not consistent with the tested condition in accordance with one or more embodiments of the invention. Many different types of software statements or hardware circuits may be used to perform the various steps of FIGS. 2F-2I. The different equivalent statements or circuits that achieve same or similar results are included within the scope of the invention.

Figure 2F:
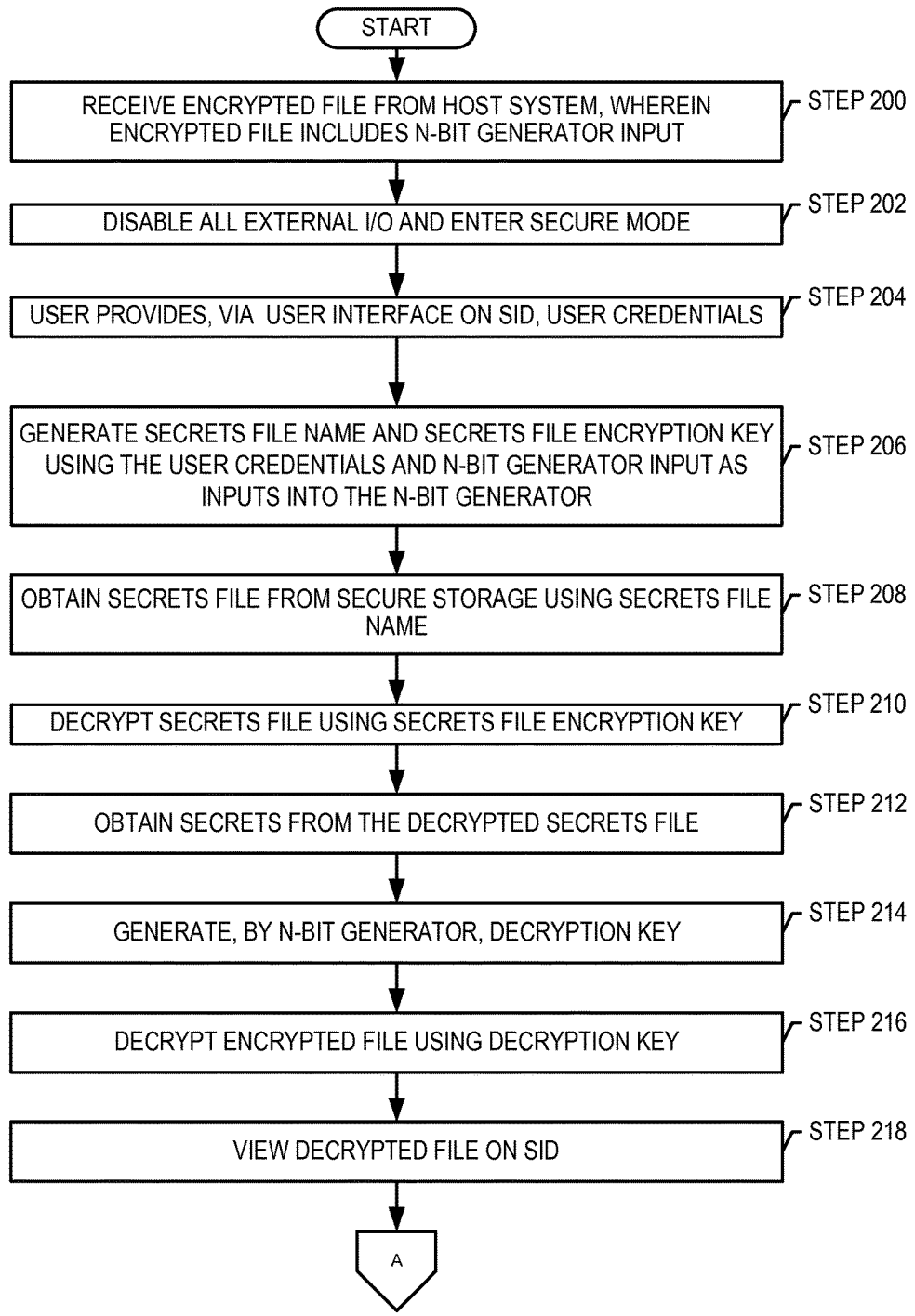

Turning to FIG. 2F, FIG. 2F shows a flow diagram in accordance with one or more embodiments of the invention. More specifically, FIG. 2F shows a flow diagram of an SID interacting with a host system in accordance with one or more embodiments of the invention.

In Step 200, an encrypted file is received from a host system. The encrypted file may be of a text file, a media file, an image file, a multi-media file, any other type of file, or any combination thereof. Further, the encrypted file may be one file or multiple files (which may or may not be compressed into a single object, e.g., combined in one zip file). In one or more embodiments of the invention, the encrypted file may include an n-bit generator input. Alternatively, the n-bit generator input may be sent to the host system in an unencrypted format. In one or more embodiments of the invention, the n-bit generator input may be a group agreed connect name. In one or more embodiments of the invention, a group agreed connect name is an identifier of the group used by all of the members. Specifically, each member of the group associates the same group agreed connect name with the group. The group agreed connect name may be an alphanumeric value which would be very difficult to memorize. Because all members associate the same group with the same group agreed connect name, the group agreed connect name may be used by a member of the group when triggering the start of a communication session with other members of the group.

In one or more embodiments of the invention, the SID may only accept encrypted files from a particular type of host system. For example, the SID may only allow connections with host systems that are on a pre-defined list, that are executing a particular operating system, implementing a particular type of hardware, implementing a particular type of authentication, implementing a particular type of software application, or any combination thereof.

In one or more embodiments of the invention, the SID may include functionality to verify whether the host system connected to a given I/O interface satisfies a particular set of requirements of the SID (as described above). The SID may verify that the host system satisfies a particular set of requirements by obtaining a digital certificate from a host system, where the digital certificate is issued by a trusted third party and the third party has independently verified that the host system satisfies the requirements of the SID. Alternatively, the SID may directly query the host system to determine if the host system satisfies the requirements of the SID. In such cases, the SID may issue one or more requests to the host system to verify various characteristics of the host system and then, based on a successful determination that the host system satisfies the SID requirements, allow the host system to connect to the SID.

In Step 202, all I/O interfaces on the SID are disabled and the SID transitions to secure mode. In one or more embodiments of the invention, if the SID is using an external secure storage, then the interface to the secure storage is not disabled. However, in such cases, the SID must have previously identified to which I/O interface the secure storage is connected. If no such operation is performed prior to entering secure mode, the SID may disable all I/O interfaces and not permit the use of an external secure storage. In one or more embodiments of the invention, the SID may identify the I/O interface over which the secure storage is connected using the same functionality as described above with respect to the SCD.

In one or more embodiments of the invention, the SID may disable I/O interfaces at the hardware level or the software level. More specifically, the SID may include functionality to stop power from being supplied to I/O interfaces that it has disabled. Alternatively, the instructions executed by the processor, or operations performed by the integrated circuit on the SID, may prevent data from being sent or received by the disabled I/O interfaces. Those skilled in the art will appreciate that other mechanisms for disabling the I/O interfaces may be implemented without departing from the invention.

Those skilled in the art will appreciate that disabling all I/O interfaces on the SID may include disabling the I/O interface to a pointing device (or equivalent device). Alternatively, the SID may include functionality to identify over which I/O interface the pointing device (or equivalent device) is connected and not disable the corresponding I/O interface.

In Step 204, the user provides user credentials to the SID using a user interface (e.g., keypad, keyboard, virtual keypad, virtual keyboard, display, and/or pointing device, etc.) on the SID. In one or more embodiments of the invention, user credentials may include, for example, a username and password. Other forms of user credentials may be used without departing from the scope of the invention.

In Step 206, a secrets file name and a secrets file encryption key are generated using the user credentials and the n-bit generator input. More specifically, in one or more embodiments of the invention, a first message digest is generated using the n-bit generator input and the user credentials as inputs into the n-bit generator. The n-bit generator generates the first message digest by applying the operations of the n-bit generator to the input values.

The secrets file name and the secrets file encryption key are extracted from the message digest. Specifically, the SCD identifies each portion of the message digest corresponding to a secrets file name and a secrets file encryption key. For example, in a 512-bit message digest, bits in bit positions 0-255 may correspond to the secrets file name, bits in bit positions 256-383 may correspond to the secrets file encryption key, and the final 128 bits may correspond to discard bits that remain unused. In one or more embodiments of the invention, because the user credentials are part of the input in Step 206, with a high probability, a different message digest is generated by each member of the group. Thus, the secrets file name and the secrets file encryption key are different for each member of the group. Thus, a nefarious individual or nefarious computer system cannot correlate file names on different members to identify the secrets file, or decrypt an encrypted secrets file using a secrets file encryption key generated by another member.

In Step 208, the secrets file name is used to obtain the corresponding secrets file from the secure storage. In Step 210, the obtained secrets file is decrypted using the secrets file encryption key. In Step 212, the secret(s) (which may also be referred to as a master secret(s)) is obtained from the decrypted secrets files. In Step 214, the n-bit generator generates a decryption key. Specifically, the n-bit result is generated using the n-bit input and the master secrets, and a decryption key is extracted from the n-bit result. In one or more embodiments of the invention, the n-bit generator generates the n-bit result. Generating the n-bit result may be performed by combining the n-bit input and master secrets using the bit shuffler to obtain an intermediate result. A hash function may be performed on the intermediate result to obtain the n-bit result. Further multiple iterations of the n-bit generator may be performed to create a larger n-bit result. For example, the intermediate result may be combined with a change value or another value, and a hash may be performed on the result of the combination to obtain additional bits in one or more embodiments. In one or more embodiments of the invention, the n-bit result is the decryption key. In another embodiment of the invention, the decryption key is a subset of the n-bit result.

In Step 216, the encrypted file (as obtained in Step 200) is decrypted using the decryption key to obtain a decrypted file.

In Step 218, the decrypted file is then presented, via the display on the SID, to the user. In one or more embodiments of the invention, because none of the I/O interfaces (except the I/O interface for the secure storage) are active, the decrypted file cannot be copied or otherwise removed from the SID. Further, in the event that the SID is using an external secure storage, the SID may disable the I/O interface between the SID and external secure storage before decrypting the encrypted file.

In one or more embodiments of the invention, if the encrypted file (obtained in Step 200) corresponds to multiple files, then Steps 204-208 may be repeated (as necessary) to obtain the appropriate number of secrets files from the external secure storage. Once the secrets files have been obtained, the SID may disable the I/O interface between the SID and the external secure storage. In such cases, none of the I/O interfaces may be re-enabled while the SID is in secure mode. The I/O interfaces may only be re-enabled when the SID enters non-secure mode (described below).

Figure 2G:
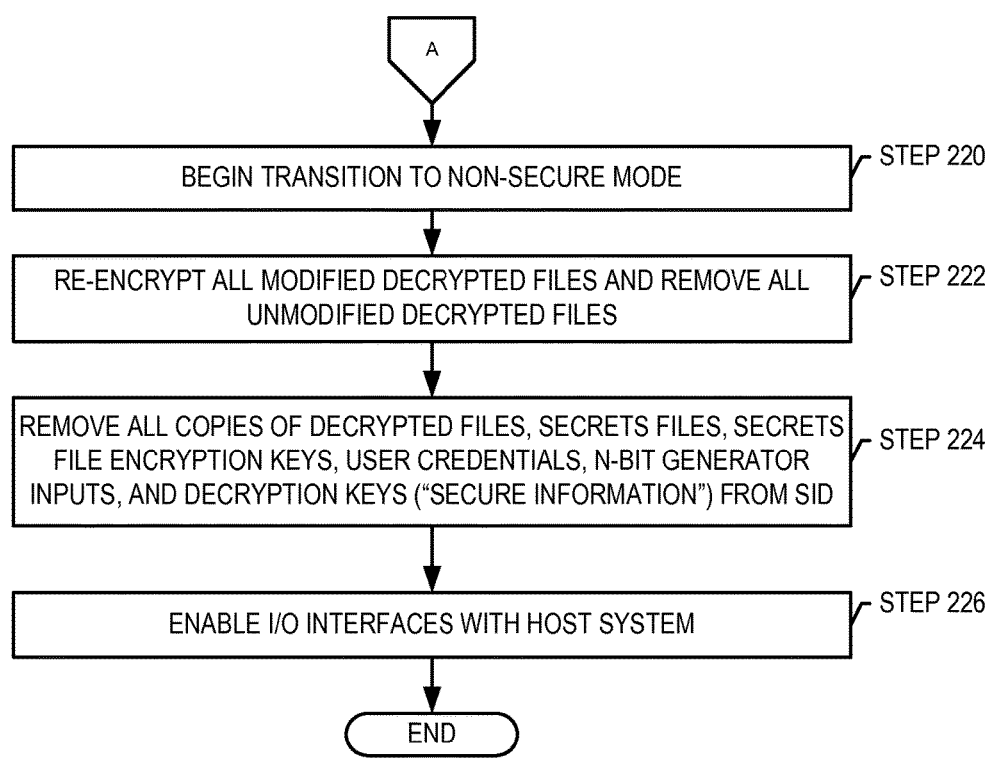
Figure 2H:
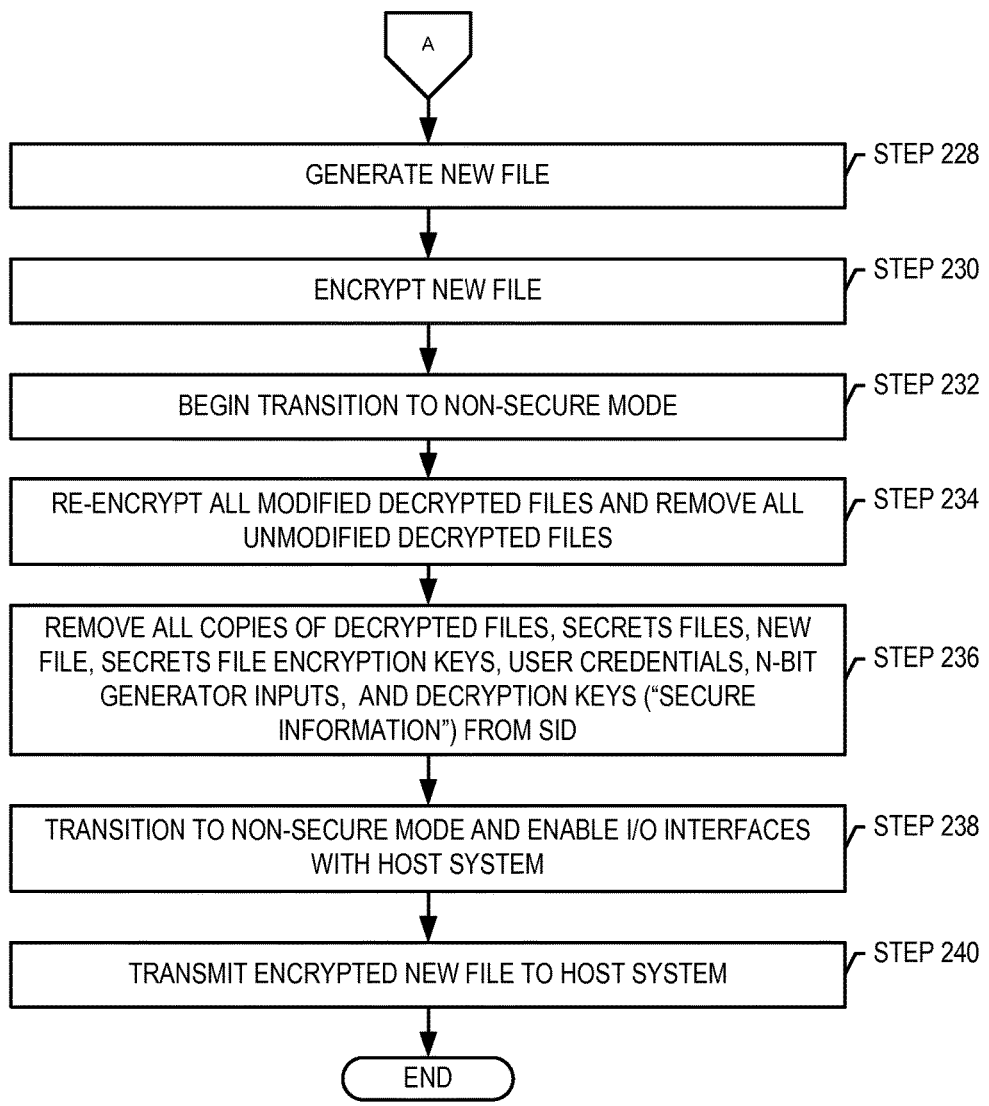
Figure 21:
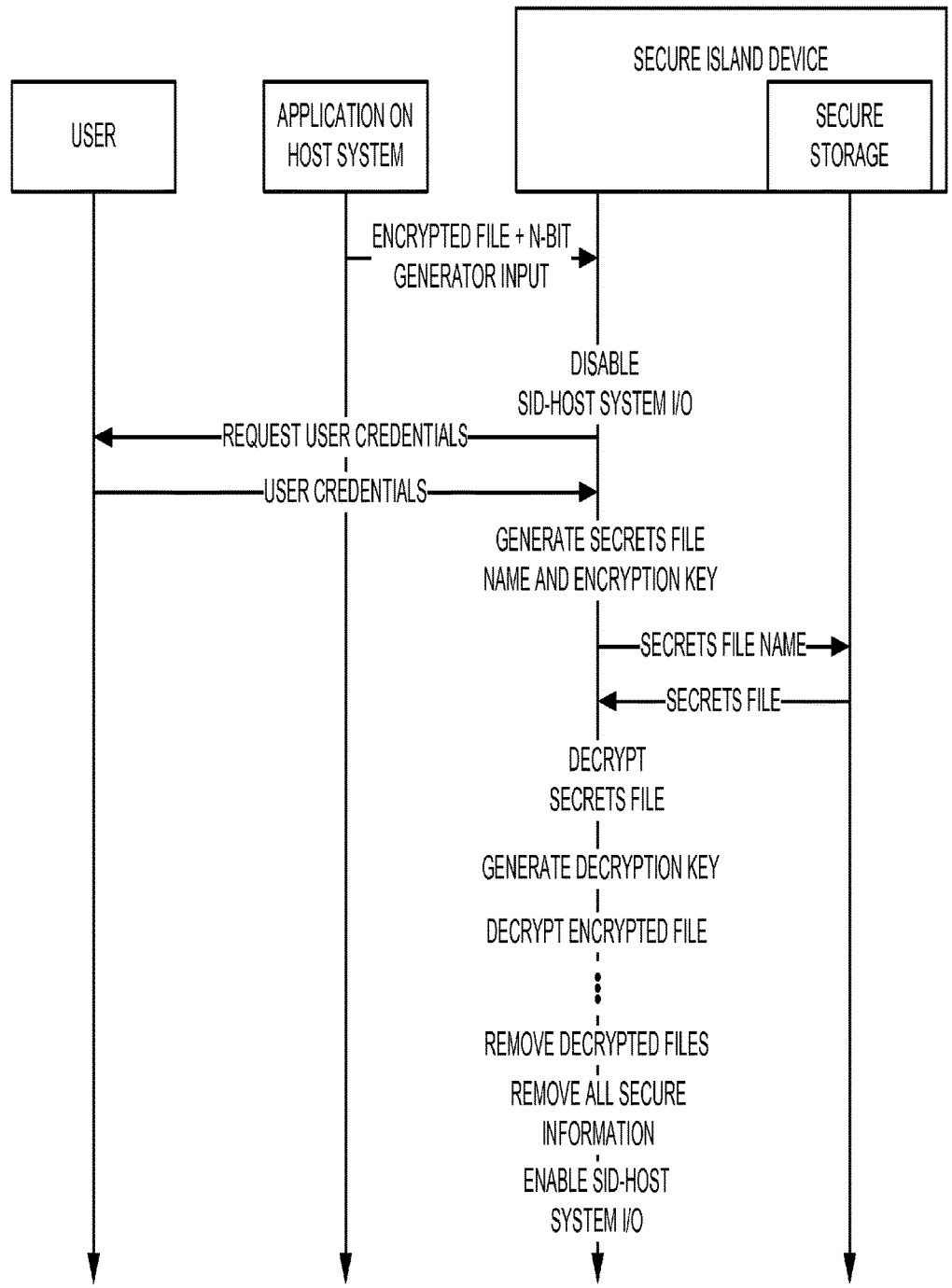

FIGS. 2G and 2H show flow diagrams for using the SID in secure mode and in transitioning the SID to non-secure mode.

Referring to FIG. 2G, in step 220, after the user has finished viewing the decrypted file, the user may begin the transition of the SID to non-secure mode. In Step 222, all modified decrypted files are re-encrypted (for example using an existing or newly generated key) and all unmodified decrypted files are removed (in the manner described below). In Step 224, all copies in any temporary or persistent storage (excluding the secure storage) of the decrypted files, secrets files, secrets files encryption keys, user credentials, n-bit generator inputs, and decryption keys (collectively "secure information") are removed from the SID. In one or more embodiments of the invention, removing the secure information includes erasing all copies and overwriting the regions in memory (volatile and non-volatile) that included the aforementioned copies. In one or more embodiments of the invention, the overwriting may be performed in accordance with standards set by the Department of Defense, set by the National Security Agency, and/or set by any other intelligence or defense agency within the USA or a foreign government.

In one or more embodiments of the invention, Step 224 may also include closing all applications executing on the SID that were involved in any of the steps in FIG. 2F. In Step 226, after successfully completing Step 224, the SID enters non-secure mode and enables at least the I/O interfaces between the SID and the host system.

Referring to FIG. 2H, in step 228, the user may use an application on the SID and the user interface (e.g., keypad, keyboard, virtual keypad, virtual keyboard, display, and/or pointing device, etc.) on the SID to generate a file (i.e., an unencrypted file).

In Step 230, the user encrypts the file using the key generated in Step 214. Alternatively, the text file may be encrypted using a new key obtained by performing the Steps 204-214.

In step 232, the user may begin the transition of the SID to non-secure mode. In Step 234, if the decrypted file has been modified by the user, the decrypted file (obtained in Step 216) is re-encrypted (for example using an existing or newly generated key). Alternatively, the decrypted file is removed from the SID. Embodiments related to removing data from the SID are described in Step 236 below. In Step 236, all copies in any temporary or persistent storage (excluding the secure storage) of the decrypted files, file(s) generated in step 228, secrets files, secrets files encryption keys, user credentials, n-bit generator inputs, encryption keys, and decryption keys (collectively "secure information") are removed from the SID. In one or more embodiments of the invention, removing the secure information includes erasing all copies and overwriting the regions in memory that included the aforementioned copies. In one or more embodiments of the invention, the overwriting may be performed in accordance with standards set by the Department of Defense, set by the National Security Agency, and/or set by any other intelligence or defense agency within the USA or a foreign government.

In one or more embodiments of the invention, Step 236 may also include closing all applications executing on the SID that were involved in any of the steps in FIG. 2F and/or Step 228-234 in FIG. 2H. In Step 238, after successfully completing Step 236, the SID enters non-secure mode and enables at least the I/O interfaces between the SID and the host system. In Step 240, the encrypted file generated in Step 230 is transmitted to the host system.

FIG. 2I shows a flow diagram in accordance with one or more embodiments of the invention. FIG. 2I shows the interaction between various components and entities in the system in accordance with one or more embodiments of the invention.

Turning to FIG. 2I, initially, a host system sends an encrypted file to the SID. The SID upon receipt of the file disables all I/O interfaces and enters secure mode.

Once in secure mode, the SID sends a request to a user, via a display on the SID, for user credentials. The user, in response to the request, inputs user credentials (via the user interface on the SID). The SID uses the user credentials as input into an n-bit generator to generate a secrets file name and a secrets file encryption key. The secrets file name is used to obtain the secrets file from the secure storage.

Upon receipt of the secrets file by the SID, the secrets file is decrypted using the secrets file encryption key. The secret(s) in the secrets file and the n-bit input are then used as input into an n-bit generator to generate a decryption key.

The decryption key is used to decrypt the encrypted file received from the host system. At this stage, the decrypted file may be viewed (and, optionally modified) by the user using the user interface (e.g., keypad, keyboard, virtual keypad, virtual keyboard, display, and/or pointing device, etc.) on the SID. At some later point, the user initiates the transition from secure mode to non-secure mode. As part of the transition, all decrypted files that have been modified are re-encrypted (or optionally erased and corresponding regions in memory overwritten as described above) and all unmodified decrypted files are removed (in the manner discussed below). The secure information (as describe above) is removed and corresponding regions overwritten. Once the transition is completed, the SID enters non-secure mode and enables I/O interfaces.

Those skilled in the art will appreciate that if the SID is connected to an external display and/or an external keyboard/keypad and the SID requires the display and/or the external keyboard/keypad to perform one or more steps shown in FIGS. 2F-2I, the I/O interfaces connected to the external display and/or external keyboard/keypad are not disabled when the SID disables all of the other I/O interfaces. In such cases, the following I/O interfaces may be active when all other I/O interfaces are disabled: (i) I/O interface to a secure storage or the secured hardware device, (ii) the I/O interface to an external display (if present) and (iii) the I/O interface to an external keyboard/keypad (if present).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method comprising:
  receiving, by a secure containment device (SCD), a request to decrypt data, wherein the request is sent from an application executing on a host system over a first input/output (I/O) interface;

disabling the first I/O interface after receiving the request from the host system;

after disabling the first I/O interface:

obtaining, by the SCD, a user credential from a user, wherein the user credential is input by the user using a user interface on the SCD;

obtaining, by the SCD, an encrypted secrets file from secure storage;

decrypting, by the SCD, the secrets file using a secrets file encryption key to obtain a decrypted secrets file, wherein the secrets file encryption key is derived using the user credential;

enabling the first I/O interface after the decrypted secrets file is obtained; and after enabling the first I/O interface:

providing the decrypted secrets file to the application over the first I/O interface.

2. The method of claim 1 wherein said disabling the first I/O interface occurs until an interrupt is received by the SCD.

3. The method of claim 1 wherein the user interface on the SCD is one selected from a group consisting of a ten digit keypad, a touch screen, and a QWERTY keyboard.

4. The method of claim 3 wherein the ten digit keypad is a virtual keypad.

5. The method of claim 3 wherein the QWERTY keyboard is a virtual keyboard.

6. A method comprising:

receiving, by a secure containment device (SCD), a request to encrypt data, wherein the request is sent from an application executing on a host system over a first input/output (I/O) interface and wherein the request includes a first data to be encrypted;

disabling the first I/O interface after receiving the request from the host system;

after disabling the first I/O interface:

obtaining, by the SCD, a user credential from a user, wherein the user credential is input by the user using a user interface on the SCD;

obtaining, by the SCD, the first data;

encrypting, by the SCD, the first data using a secrets file encryption key to obtain an encrypted secrets file, wherein the secrets file encryption key is derived using the user credential;

storing, by the SCD, the encrypted secrets file in secure storage; and enabling the first I/O interface.

7. The method of claim 6 wherein said disabling the first I/O interface occurs until an interrupt is received by the SCD.

8. The method of claim 6 wherein the user interface on the SCD is one selected from a group consisting of a ten-digit keypad, a touch screen, and a QWERTY keyboard.

9. The method of claim 8 wherein the ten-digit keypad is a virtual keypad.

10. The method of claim 8 wherein the QWERTY keyboard is a virtual keyboard.

11. A system comprising:

a host system for executing at least one application;

a secure containment device for performing cryptographic operations in support of the at least one application;

a first I/O interface for selective communication between said host system and said secure containment device, said first I/O interface capable of being selectively disabled through an interrupt-driven process; and a user interface for user communication directly with said secure containment device without using said first I/O interface;

wherein said first I/O interface is configured to be selectively disabled to prevent communication between said host system and said secure containment device while said secure containment device is performing cryptographic operations; and wherein said user interface is capable of selectively communicating with said secure containment device while said first I/O interface is disabled.

12. The system of claim 11 wherein the user interface on the SCD is a ten-digit keypad.

13. The system of claim 12 wherein the ten-digit keypad is a virtual keypad.

14. The system of claim 11 wherein the user interface on the SCD is a touch screen.

15. The system of claim 11 wherein the user interface on the SCD is a QWERTY keypad.

16. The system of claim 15 wherein the QWERTY keypad is a virtual keypad.

17. The system of claim 11 wherein the user interface comprises a keyboard and a display.

18. A method comprising:

receiving, by a secure containment device (SCD), a request to decrypt data, wherein the request is sent from an application executing on a host system over a first input/output (I/O) interface;

disabling the first I/O interface after receiving the request from the host system;

after disabling the first I/O interface:

obtaining, by the SCD, a token activation code from a secured hardware token, wherein the token activation code is provided as a result user interaction with a secured hardware token interface on the secured hardware token;

obtaining, by the SCD, an encrypted secrets file from secure storage;

decrypting, by the SCD, the secrets file using a secrets file encryption key to obtain a decrypted secrets file, wherein the secrets file encryption key is derived using the token activation code;

enabling the first I/O interface after the decrypted secrets file is obtained; and after enabling the first I/O interface:

providing the decrypted secrets file to the application over the first I/O interface.

19. The method of claim 18 wherein said disabling the first I/O interface occurs until an interrupt is received by the SCD.

20. A method comprising:

receiving, by a secure containment device (SCD), a request to encrypt data, wherein the request is sent from an application executing on a host system over a first input/output (I/O) interface and wherein the request includes a first data to be encrypted;

disabling the first I/O interface after receiving the request from the host system;

after disabling the first I/O interface:

obtaining, by the SCD, a token activation code from a secured hardware token, wherein the token activation code is provided as a result user interaction with a secured hardware token interface on the secured hardware token;

obtaining, by the SCD, the first data;

encrypting, by the SCD, the first data using a secrets file encryption key to obtain an encrypted secrets file, wherein the secrets file encryption key is derived using the token activation code;

storing, by the SCD, the encrypted secrets file in secure storage; and enabling the first I/O interface.

21. The method of claim 20 wherein said disabling the first I/O interface occurs until an interrupt is received by the SCD.

* * * * *